United States Patent [19]
Schneider

[11] Patent Number: 5,668,987
[45] Date of Patent: Sep. 16, 1997

[54] DATABASE SYSTEM WITH SUBQUERY OPTIMIZER

[75] Inventor: Peter Schneider, San Ramon, Calif.

[73] Assignee: Sybase, Inc., Emeryville, Calif.

[21] Appl. No.: 522,047

[22] Filed: Aug. 31, 1995

[51] Int. Cl.[6] .................................................. G06F 17/30
[52] U.S. Cl. ............................................ 395/603; 395/602
[58] Field of Search ........................ 395/600, 440–479, 395/603, 602

[56] References Cited

U.S. PATENT DOCUMENTS

| | | | |
|---|---|---|---|
| 4,497,319 | 2/1985 | Bozman | 364/200 |
| 4,527,253 | 7/1985 | Sato et al. | 364/900 |
| 5,062,055 | 10/1991 | Chinnaswamy et al. | 364/513 |
| 5,210,870 | 5/1993 | Baum et al. | 395/600 |
| 5,237,681 | 8/1993 | Kagan et al. | 395/600 |
| 5,394,531 | 2/1995 | Smith | 395/425 |
| 5,450,561 | 9/1995 | Ryan | 395/403 |
| 5,465,352 | 11/1995 | Nakazawa et al. | 395/600 |
| 5,495,591 | 2/1996 | Ryan | 395/421.03 |
| 5,526,511 | 6/1996 | Swenson et al. | 395/461 |
| 5,537,635 | 7/1996 | Douglas | 395/456 |

*Primary Examiner*—Thomas G. Black
*Assistant Examiner*—Donald Min
*Attorney, Agent, or Firm*—John A. Smart; David N. Slone

[57] ABSTRACT

Database system and methods are described for improving execution speed of database queries (e.g., for decision support) by optimizing execution of nested queries or "subqueries," such as are commonly used in client/server database environments. In particular, a subquery cache is provided having a size which can be dynamically adjusted by the system during execution of the query, for achieving an optimal cache size. During execution of the subquery, the system keeps statistics on cache "hits" and "misses." Specifically, the system stores a count of the number of times a row is found in the cache (i.e., a "hit") as well as a count of the number of times a scan of the cache yields no "hit" (i.e., a "miss"). Also, a maximum LRU (least-recently used) depth of the deepest hit in the cache is also tracked. This tracks how deep (i.e., the deepest row) into the cache there has been a "hit." Based on the tracking of these cache statistics, the system of the present invention can dynamically adjust subquery cache size to an optimal size at execution time based on actual data encountered during execution of the query.

24 Claims, 8 Drawing Sheets

TABLES:

TABLE T1 — 310
| C1 | C2 |
|---|---|
| 1 | 1 |
| 2 | 4 |
| 3 | 6 |
| 4 | 10 |

TABLE T2 — 320
| C3 | C4 |
|---|---|
| 1 | 0 |
| 2 | 1 |
| 3 | 0 |
| 4 | 1 |

SQL QUERY: — 330

```
SELECT C1 FROM T1 WHERE
    C2=(SELECT MAX(C3) FROM T2 WHERE T2.C4 = T1.C1)
```
— 335

SUBQUERY CACHE:

SUBQUERY CACHE — 340
| T1.C1 | MAX(C3) |
|---|---|
| 1 | 1 |
| ... | ... |

TABLES:

```
         ┌─── 310                    ┌─── 320
    TABLE T1                      TABLE T2
   C1  |  C2                     C3  |  C4
   ─────────                     ─────────
    1  |  1                       1  |  0
    2  |  4                       2  |  1
    3  |  6                       3  |  0
    4  |  10                      4  |  1
```

SQL QUERY:                                    ← 330

SELECT C1 FROM T1 WHERE
   C2=(SELECT MAX(C3) FROM T2 WHERE T2.C4 = T1.C1)
   |_____|
                                                                         └── 335

*FIG. 3A*

TABLES:

TABLE T1 — 310

| C1 | C2 |
|----|----|
| 1  | 1  |
| 2  | 4  |
| 3  | 6  |
| 4  | 10 |

TABLE T2 — 320

| C3 | C4 |
|----|----|
| 1  | 0  |
| 2  | 1  |
| 3  | 0  |
| 4  | 1  |

SQL QUERY: — 330

```
SELECT C1 FROM T1 WHERE
    C2=(SELECT MAX(C3) FROM T2 WHERE T2.C4 = T1.C1)
```
— 335

SUBQUERY CACHE:

SUBQUERY CACHE — 340

| T1.C1 | MAX(C3) |
|-------|---------|
| 1     | 1       |
| ...   | ...     |

*FIG. 3B*

DATABASE SYSTEM WITH SUBQUERY OPTIMIZER

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to maintenance of indexes to information stored in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly database queries, for enhancing decision support.

SUMMARY OF THE INVENTION

The present invention comprises a Client/Server Database System with improved methods for performing database queries. In an exemplary embodiment, the system includes one or more Clients (e.g., Terminals or PCs) connected via a Network to a Server. The Server, operating under a server operating system (e.g., UNIX) includes a Database Server System, such as Sybase SQL Server™. In general operation, Clients store data in and retrieve data from one or more database tables resident on the Server by submitting SQL commands, some of which specify "queries"—criteria for selecting particular records of a table.

For enhancing the speed in which the Database Server performs queries, the Server optimizes queries for the common instance of nested queries or "subqueries." In particular, a subquery cache is provided having a size which can be dynamically adjusted by the system during execution of the query, for achieving an optimal cache size.

The system initially assumes (e.g., at compile time) that a large cache is optimal. At the outset, therefore, the cache is set to a large size, such as 2K (kilobytes) of memory or larger; preferably, a size is selected which is optimal for the hardware's and/or operating system's preferred storage unit—such as 2K pages. From that cache size a corresponding number of rows are allocated (which varies depending on the size of the columns which are stored in the cache). During execution of the subquery, the system keeps statistics on cache "hits" and "misses." Specifically, the system stores a count of the number of times a row is found in the cache (i.e., a "hit") as well as a count of the number of times a scan of the cache yields no "hit" (i.e., a "miss"). Finally, an "LRU Depth" of the deepest hit in the cache is also tracked. Since the cache can adjust its size dynamically, it itself has a "depth"—that is, how many rows comprise the cache at a given instance. An "LRU Depth" variable is therefore employed to track how deep (i.e., the deepest row) into the cache there has been a "hit." Based on the cache statistics (as tracked above), the system of the present invention can dynamically adjust subquery cache size based on actual data encountered during query execution.

BRIEF DESCRIPTION OF THE DRAWINGS

FIGS. 3A–B are block diagrams illustrating use of a subquery cache.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
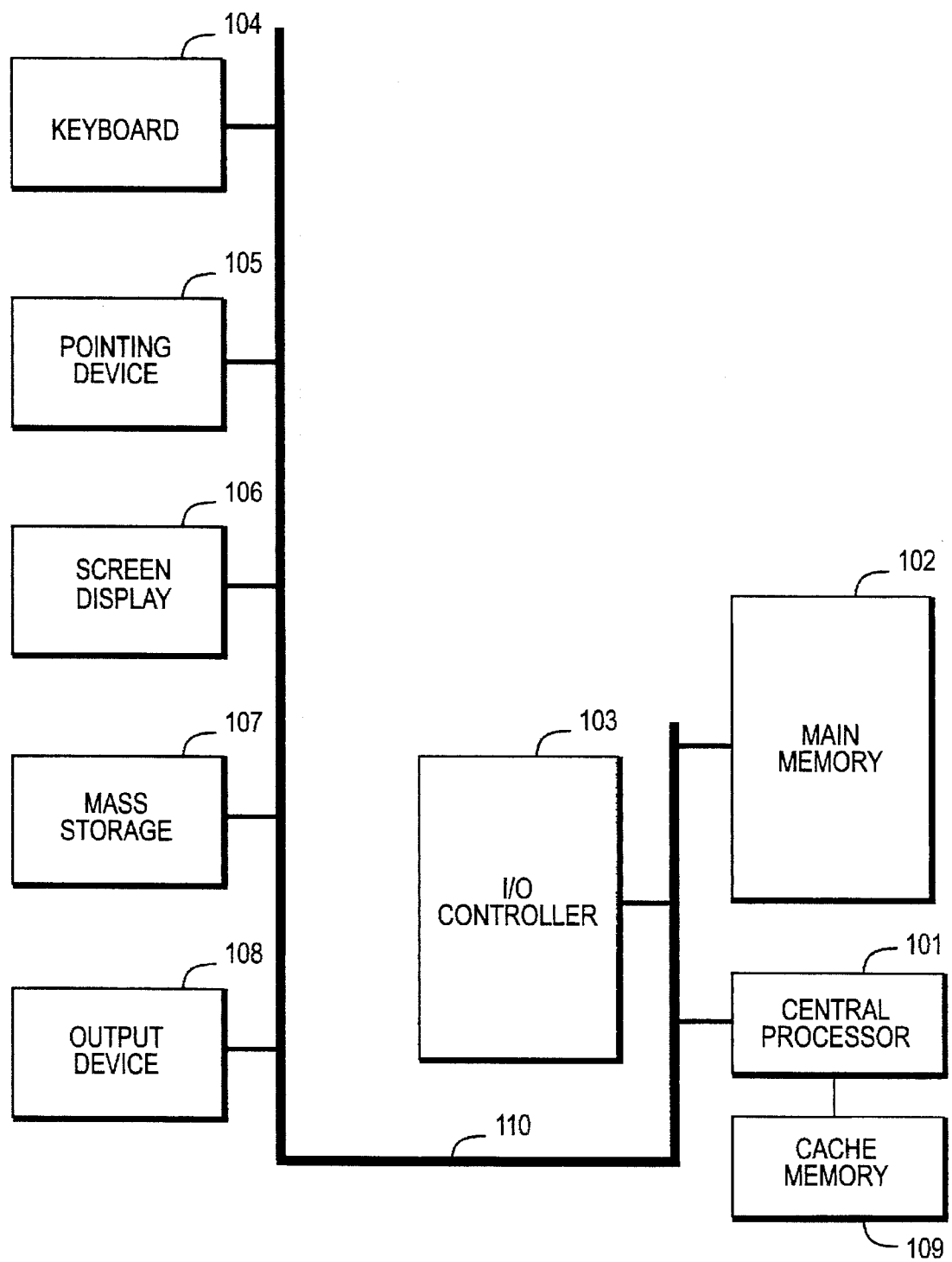
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
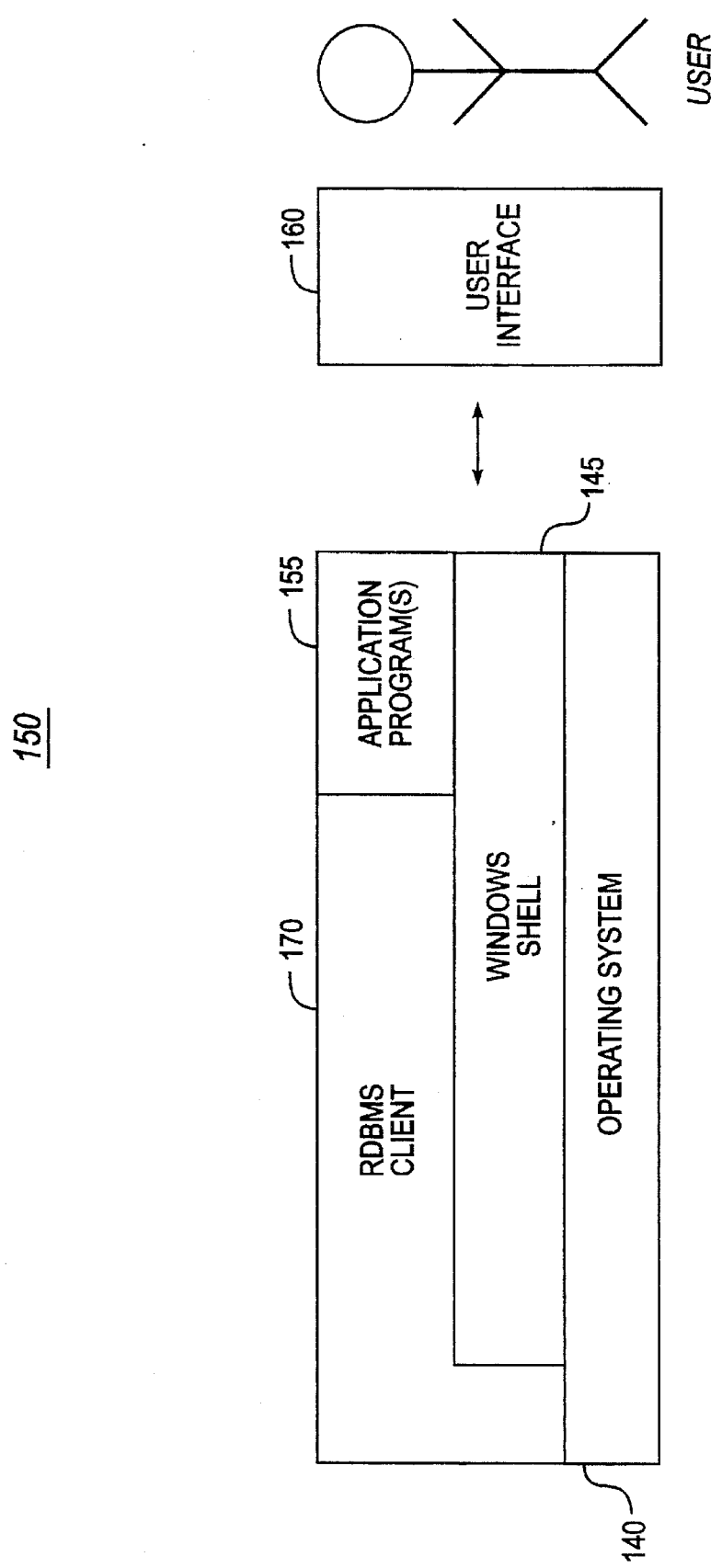
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a Client/Server environment.

Client/Server Database Management System

While the present invention may operate within a single (standalone) computer (e.g., system 100 of FIG. 1A), the present invention is preferably embodied in a multi-user computer system, such as a Client/Server system. FIG. 2A illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using Net Ware*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

Figure 2:
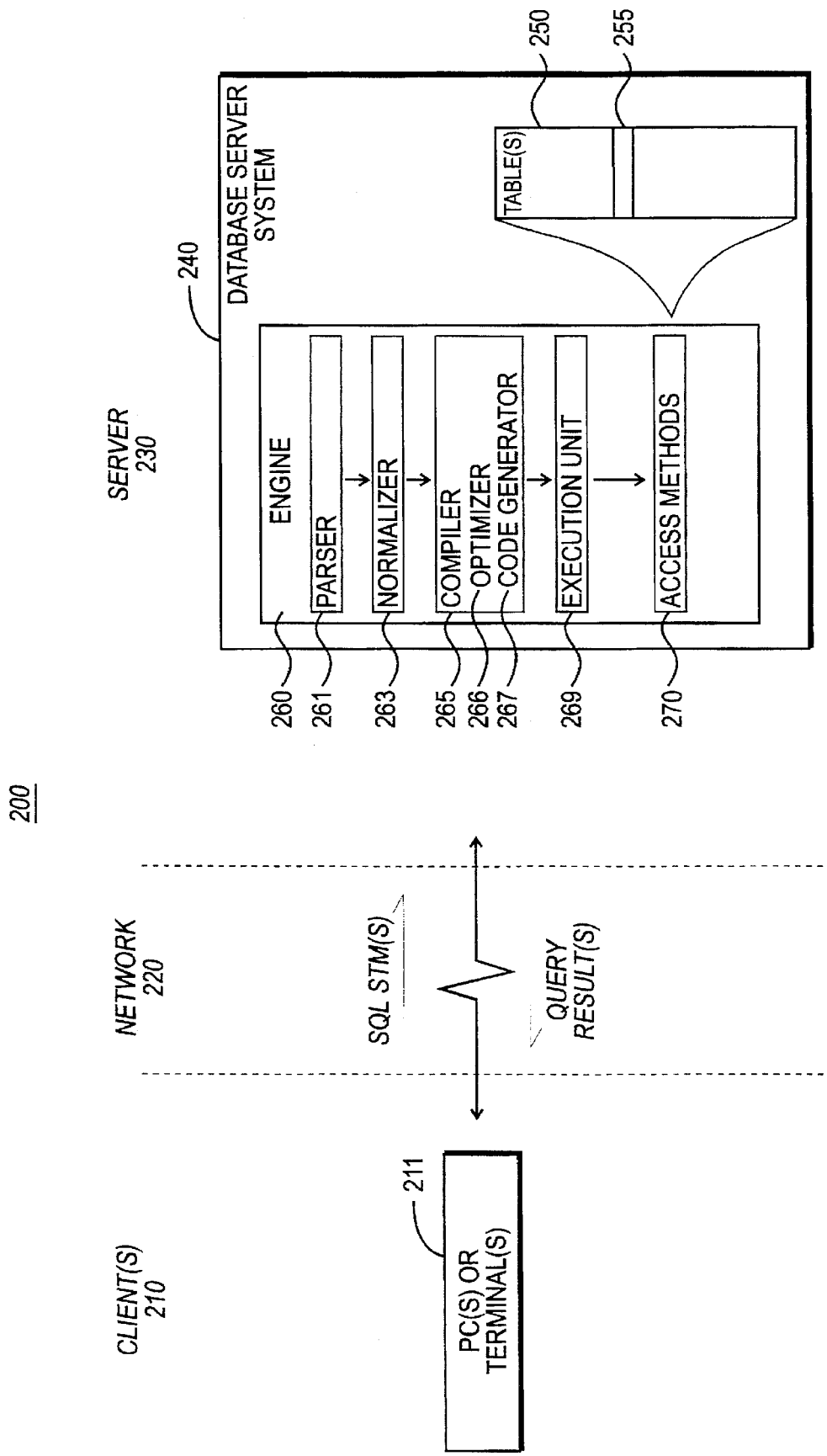
FIG. 2 is a block diagram of a client/server system in which the present invention is preferably embodied.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

Of particular interest to the present invention is the optimization of query execution in the presence of one or more subqueries—queries embedded within other queries. Modification of the Engine 260 for achieving this optimization will now be described in farther detail.

Optimizing Queries

A. Queries and Subqueries

Initially, it is helpful to review the nature of SQL queries. In SQL, a construct exists called a "subquery." A subquery may be thought of as a "query within a query" (i.e., a nested query). In some types of subqueries, the subquery references the outer query (i.e., the query in which the subquery is embedded within). This is perhaps best illustrated by way of example.

FIG. 3A illustrates diagrammatically such a situation. Consider two database tables, table T1 (shown at 310) and table T2 (shown at 320). Each table comprises two columns: columns C1 and C2 for table T1, and columns C3 and C4 for table T2. An example of a query having a subquery for the above two tables is shown at 330, as follows:

SELECT C1 FROM T1 WHERE C2=(SELECT MAX(C3) FROM T2 WHERE T2.C4=T1.C1)

Note, in particular, the subquery which occurs at 335, as follows:

SELECT MAX (C3) FROM T2 WHERE T2.C4=T1.C1

The query operates as follows. A query result is constructed such that values are selected from column C1 of T1 in the instance where column C2 is equal to the result of the subquery expression (335). Here, the value of colunm C1 from table T1 (i.e., T1.C1) is used in the subquery. In particular, the subquery specifies the selection of the maximum value from column C3 of table T2 but only for instances where the value of column C4 of table T2 (i.e., T2.C4) equals the value of column C1 of table T1 (i.e., T1.C1). When the subquery is evaluated on the tables, an answer is generated. The value to which the subquery resolves is then employed in the outer query (i.e., in the "WHERE" clause). For instances where C2 is equal to the subquery value, the value in colunm C1 of table T1 is selected into the query result. In operation, such a query is typically processed sequentially—that is, the query expression would be evaluated for the first row of T1, followed by the second row, and so forth and so on until all rows have been evaluated.

Since reducing the time required for processing queries improves system performance, it is highly desirable to optimize queries of the foregoing type. Without further optimization, processing of a query containing a subquery in real-time is particularly burdensome, especially since a relatively high number of computations (and possibly disk or network input/output operations) must be performed in order to evaluate each row of the table under examination. Moreover, the foregoing example has, for purposes of clarity of explanation, focused on a subquery having a single input value, namely T1.C1. In real-world applications, subqueries will often depend upon multiple input values and, thus, entail further performance penalties.

B. Subquery Cache

A simple approach to optimizing the above query is to employ a "subquery cache." The subquery cache is a local cache or memory buffer which operates to save values which have already been processed for the subquery, thereby avoiding recalculation or reevaluation of the subquery upon later encounter of the identical subquery input values.

FIG. 3B illustrates a simple subquery cache 340 for the example of FIG. 3A. As shown, for example, upon the system evaluating the subquery for T1.C1 equal to 1 (i.e., T1.C1=1), it may cache the once-computed value of max (C3); here, the value of 1. Given a subquery cache, each time the query is executed for a row, before the system undertakes the task to compute the subquery, it can first perform a lookup on the then-current input value or values to the subquery for determining whether the result value for the subquery is already known. If the subquery result is already present in the cache, the system may simply retrieve it and continue processing the query, all without having to execute the subquery for that row under evaluation.

The foregoing simple approach to caching has both advantages and disadvantages. The principle advantage is if a cache hit (i.e., lookup with appropriate match) occurs, the system has saved time which would otherwise be required for executing the subquery to resolve a subquery result value. The principle disadvantage occurs in cases of cache "misses" (i.e., cache lookup with no match). If many rows are present in the subquery cache (i.e., many values have been cached), the system must still perform the subquery evaluation even after all the rows in the subquery cache have been scanned. All the scanning time is wasted, in the case of a cache miss. It is therefore desirable to achieve the "right" size for the cache—that is, an optimal number of cache entries or rows for the query under execution. Moreover, the optimal number of rows for the subquery cache will likely vary from one query to another.

C. Static Approach to Optimizing Subquery Cache Size

One approach to optimizing cache size is to simply set the size equal to one row. During processing of the query, if the lookup value or values (i.e., input value(s) to the subquery expression) matches the value or values stored by the one row of the cache, then the corresponding subquery result value can be simply retrieved from the cache, thereby avoiding execution of the subquery expression. If the value is not there (i.e., cache "miss"), on the other hand, the subquery is executed and the subquery cache is then updated with the then-current value(s).

The foregoing approach achieves good results in situations where the data tables are sorted. In sorted data, there exists potentially long runs of identical subquery input values. During a scan, as long as the subquery value(s) remains unchanged, a cache hit will occur, thereby eliminating an execution of the subquery. When the subquery value changes, the cache is in effect updated with new value(s) and can continue yielding "hits" until the next change in subquery value (i.e., after the run of the then-current value). If the data records are not sorted (e.g., appear in random order), however, the approach achieves no benefit (and actually incurs some overhead penalty).

As an enhancement to the foregoing, another approach is to examine the data tables at compile time to determine whether the records are sorted. If it can be determined that the records are sorted, the system can pre-select a one record cache. If, on the other hand, the records are not sorted, the system may revert to a fixed-size cache, such as a 4K memory buffer (or multiple thereof). Since this is done at compile time, the size of the cache itself does not change during execution time.

For the latter case (i.e., a cache employing multiple rows or entries), generally cache rows are filled on a least-recently used (LRU) basis. After the cache is scanned and a "miss" occurs (i.e., no match), the subquery is executed and its input value(s)/result value pair is added to the top (i.e., first row) of the subquery cache. In this manner, subsequent scans of the cache will first compare the then-current subquery value(s) against recently-encountered subquery values.

Although an improvement over the "always one row" approach, the foregoing fixed-size cache approach will not achieve good results for all classes of queries. Accordingly, a better approach—one which takes into account values actually encountered in the data during subquery execution—is desired.

D. Statistical-Based, Dynamic Approach to Optimizing Subquery Cache Size

1. Overview

According to the present invention, the size of the cache can be dynamically adjusted by the system during execution of the query, for achieving an optimal cache size. Additionally, the system decides when to in fact perform the size adjustment. The preferred approach will now be described in detail.

The system initially assumes (e.g., at compile time) that a large cache is optimal. At the outset, therefore, the cache is set to a large size, such as 2K of memory or larger; preferably, a size is selected which is optimal for the hardware's and/or operating system's preferred storage unit—such as 2K pages. From that cache size a corresponding number of rows are allocated (which varies depending on the size of the columns which are stored in the cache). In an exemplary embodiment employing an initial cache of 2K, the cache will generally store on the order of about 50 to 150 rows. Therefore, in an exemplary embodiment, the subquery cache is initially set to a size of about 50 to 150 rows.

During execution of the subquery, the system keeps statistics on cache "hits" and "misses." Specifically, the system stores a count of the number of times a row is found in the cache (i.e., a "hit") as well as a count of the number of times a scan of the cache yields no "hit" (i.e., a "miss"). Finally, an "LRU Depth" of the deepest hit in the cache is also tracked. Since the cache can adjust its size dynamically, it itself has a "depth"—that is, how many rows comprise the cache at a given instance. An "LRU Depth" variable is therefore employed to track how deep (i.e., the deepest row) into the cache there has been a "hit."

If, depending on actual data encountered, it turns out that a large cache size is best, then the system has at the outset already achieved optimal cache size. On the other hand, a large cache size might not be optimal or might even be a detriment for the given data set. In such an instance, the system should adjust the cache size to reach quickly the optimal cache size (i.e., make the large cache smaller) for the given data set. Using the three parameters—hit counter, miss counter, and LRU depth—the system of the present invention can achieve this goal.

2. Internal Operation

The system of the present invention adopts the following method for adjusting cache size based on cache statistics (as tracked by the above mentioned counters). In general operation, the method counts up the number of misses until it has an equivalent number of misses as the number of rows in the cache. In essence, the system waits until the cache has been completely filled once. Upon reaching that point, the method invokes a subroutine which evaluates the statistics of the cache for the first time.

Figure 4A:
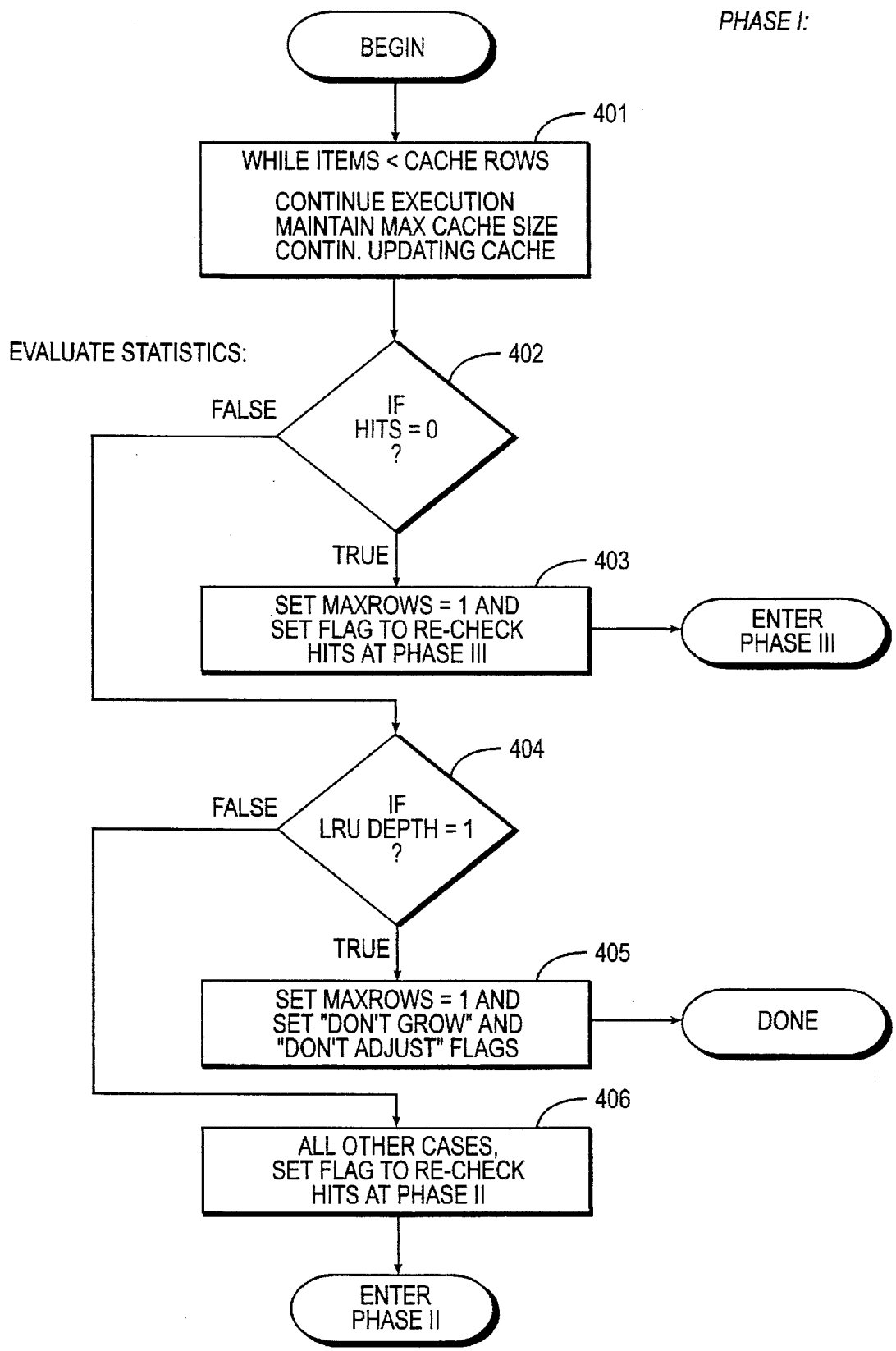
FIGS. 4A–C are flow charts illustrating a preferred method of the present invention for dynamically adjusting subquery cache size during query execution, based on cache statistics.
Figure 4B:
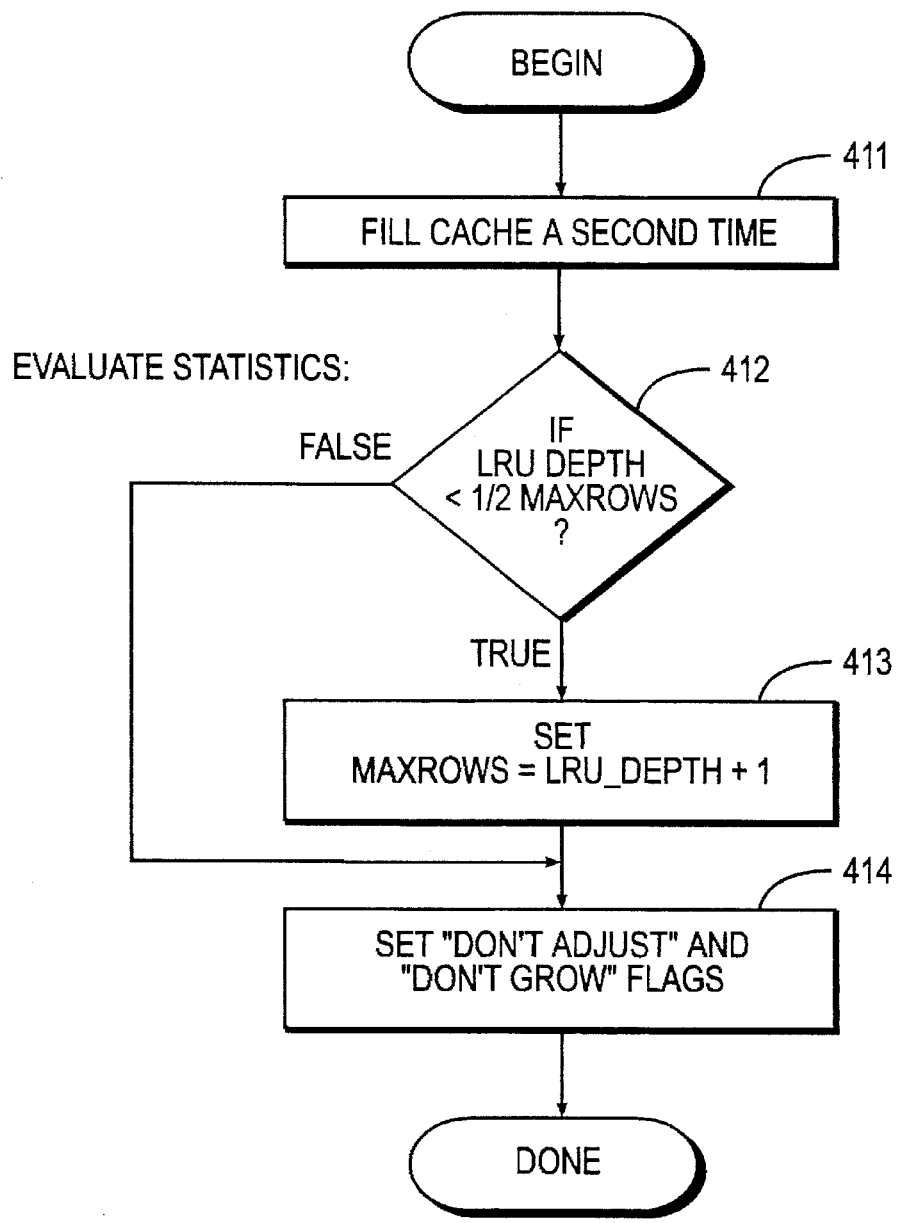
Figure 4C:
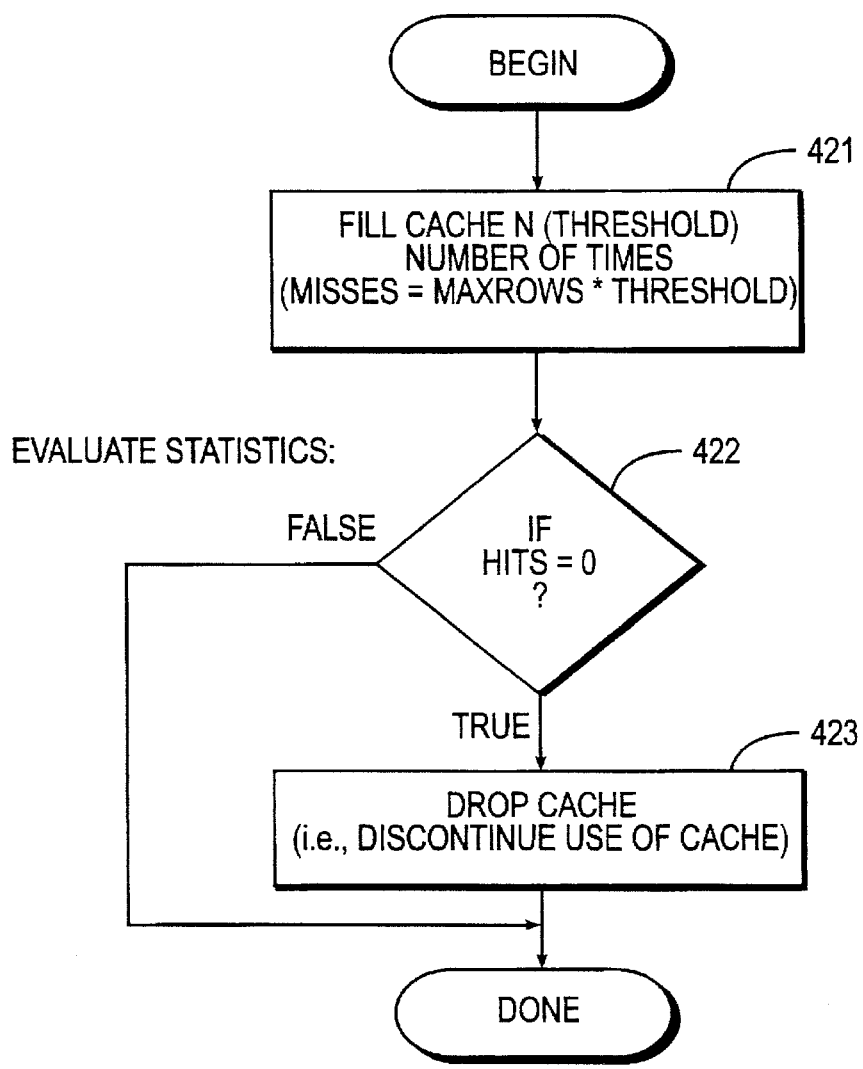

The evaluation and adjustment of cache size can, for convenience of description, be divided into three phases, as illustrated in FIGS. 4A–C. The first phase, Phase I, is to fill the cache and observe how effective it is on the basis of its initial size (i.e., however many rows fit within that pre-selected size). While the number of items is less than the cache size (step 401), the method continues to execute and maintain the cache at maximum size; any unique items (i.e., values) are added to the cache. Up to this point (i.e., before the cache is full), new values added to the cache will not displace any old values. Hence, Phase I serves to fill the cache once.

For certain queries, the cache may never get full, in which case query execution never reaches Phase II or Phase III. In the previously-described example of a table storing 100,000 data records having 14 unique types randomly arranged, an exemplary cache of 2K (e.g., 50 or more rows) would never be completely filled and thus would not enter other phases. In such cases, the system has achieved an optimal cache size by utilizing less than the maximum cache size.

After Phase I (i.e., the cache is filled for the first time), the method determines, at steps 402–406, what to do about the now-filled cache. If the number of "hits" at this point is equal to zero (i.e., there have been absolutely no cache "hits" whatsoever), step 402, the method reduces the cache size to one row (MAXROWS=1) for the rest of the execution. Additionally at this point, the method sets a flag indicating that the system should recheck "hits" at Phase III (skipping Phase II). This is performed at step 403. The foregoing, therefore, is the approach adopted for the case where no "hits" have occurred.

The next case tested is whether all hits occurred on the first row of the cache, at step 404. In such an instance, the LRU depth (or alternatively the number of cache "moves") will be equal to 1. For this case, this system sets the cache size equal to one row (MAXROWS equals 1), at step 405. Additionally at this point, the system sets flags specifying "don't grow" and "don't adjust" the cache size. For this case, no further adjustments or testing for adjusting the cache size occur during execution of the query.

The third condition which exists at this point are all other cases—cases where cache hits exist beyond the first row. Here, at step 406, the method sets a flag indicating that hits should be rechecked at Phase II.

At Phase II, shown in FIG. 4B, the cache is filled a second time. Specifically, as shown at step 411, the method dictates that the system fill the cache until the number of misses equals twice the cache size. Note that to get to Phase II, some hits must have occurred and their LRU Depth must be greater than the first row. If, in Phase II, the cache is not filled a second time, query execution will not enter Phase III.

For the instance where the cache is filled a second time in Phase II, the method specifies that the system re-examines cache statistics. Specifically, the system at this point looks at the LRU Depth. If the LRU Depth is less than one-half the cache depth (i.e., MAXROWS), tested at step 412, the system reduces the cache size (i.e., reduces MAXROWS) to LRU Depth plus 1, at step 413. Additionally, flags are set specifying "don't grow" and "don't adjust," at step 414. At the conclusion of Phase II, regardless of whether the cache size has been dynamically adjusted, the system will not undertake further adjustment or examination of the cache size. In other words, all cases which enter Phase II conclude without entering Phase III.

Phase III, illustrated in FIG. 4C, is reserved for the case in Phase I where the number of "hits" equals zero. Phase III acts as a "safety catch." Here, if the cache is not serving to optimize execution of the query, Phase III will terminate caching altogether. In Phase III, the system waits until the cache fills up a pre-selected number of times—an empirically-set threshold value—at step 421. In an exemplary embodiment employing Sybase SQL Server™, it has been observed that an empirical value ranging from about 5 to 15, or more preferably about 10, yields good results. Those skilled in the art will appreciate that the threshold value may be "tuned" for optimizing a particular environment and/or data set. When the number of misses equals the original cache size (original MAXROWS) multiplied by the empirical threshold or scale, the system re-examines the number of hits. If the number of hits is equal to zero, at step 422, the method specifies that the system simply drop the cache, at step 423, thereby avoiding its overhead for subsequent execution of the query expression.

Construction of the Preferred Embodiment

The following description will focus on a preferred implementation of using the C programming language. The C programming language itself is fairly documented in the technical, trade and patent literature.

A. Data Structures

At the outset, it is helpful to examine data structures which are employed during operation of query optimization of the present invention. A subquery data structure, e_subquery, characterizes the subquery as follows:

```
/*
** E_SUBQUERY
**
** This structure is used by the E_RUNSUBQ eval to execute a subquery.
** It is linked off the E_STEP
*/
typedef struct e_subquery
{
    struct e_subquery   *e_sqnext;         /* Next subquery in E_STMT */
    int                 e_sqpredicate;     /* subquery predicate */
    struct e_step       *e_sqplan;         /* Steps needed to execute
                                           ** this subquery. */
    struct tree         *e_sqresult;       /* Result value for this subq */
    struct constlist    *e_sqcorrlist;     /* List of CONSTANTs containing
                                           ** values of correlation cols.
                                           */
    struct e_sqcache    e_cache;           /* The data for the cache
                                           ** for this subquery.
                                           */
    /*
    ** Linked list of J_CACHE_USED structures describing the maximum
    ** buffer pool usage across all the CMD nodes in this subquery.
    ** See decision.h for a picture of how this field is used.
    */
    BYTE                *e_sqBufferCacheUsed;
    subqid_t            e_sqNumber;        /* Subquery number */
    sqlevel_t           e_sqLevel;         /* Subquery level */
    short               e_sqLineNumber;    /* line subquery appears on */
    BYTE                spare[4];
} E_SUBQUERY;
```

The structure stores a chain of pointers pointing to structures holding the values passed in from the subquery. It also stores a pointer to where the result value for the subquery execution is stored. e_sqpredicate is a data structure describing the type of subquery, such as "in," "not in," "equal," and the like. *e_sqplan points to a structure describing the query plan. This is the output of compilation—what the execution unit or engine interprets to execute the query. *e_sqresult points to a structure that contains the result of the execution of the subquery. *e_sqcorrlist points to a list of correlation values; these are values passed down from the outer query for use within the subquery to get the subquery result. The e_sqresult and e_sqcorrlist structures are data structures storing values which are of interest in the subquery cache; the system looks in the cache for matching the corrlist values and transferring the result value upon reaching a match. Another element in the structure is e_cache. This references the subquery cache structure (of type e_sqcache).

The subquery data structure also includes other data members for optimization and housekeeping. *e_sqBufferCacheUsed, for example, describes buffer usage. Other housekeeping members provide information about subquery identity or number (e_sqNumber), level of nesting (e_sqLevel), and the line number the subquery is within the query (e_sqLineNumber).

E_SQCACHE is used to group the subquery-cache variables within the E_SUBQUERY structure. The structure is defined as follows:

```
/*
** E_SQCACHE
**
*/
typedef struct e_sqcache
{
    struct e_sqrow      *e_resfreelist; /* List of rows which are still
                                        ** available for the subq cache.
                                        */
    struct e_sqrow      *e_rescache;    /* The first row in the cache */
    struct e_sqrow      *e_lastrow;     /* Oldest row in the cache */
    int                 e_sqhits;       /* Number of cache hits for 'set
                                        ** statistics subquerycache on'.
                                        */
    int                 e_sqmisses;     /* Number of cache misses for 'set
                                        ** statistics subquerycache on'.
                                        */
    int                 e_lru_mvs;      /* Number of times a row was moved
                                        ** up in the LRU cache.
                                        */
    int                 e_cache_cmps;   /* Number of compares in cache */
    int                 e_sqcstatus;    /* Status field for cache */
    short               e_maxsqrows;    /* Number of configured cache rows */
    short               e_actsqrows;    /* Number of actual (used) cache rows */
    short               e_nextchck;     /* Number of misses when next to
                                        ** check whether to adjust cache size.
                                        */
    short               e_lru_maxdepth; /* Maximum depth, from the top of
                                        ** the cache where a hit occurred.
                                        */
    int                 e_spare1;       /* Spare */
} E_SQCACHE;
```

The above structure describes the cache. It includes an e_lru_maxdepth, which describes how deep the maximum hit was. Further, the structure stores a count of "hits" and a count of "misses," e_sqhits and e_sqmisses. The status field, e_sqcstatus, stores information describing which phase to enter next. The data member e_maxsqrows holds the maximum size of the cache in rows that the cache can have. It is also, in a preferred embodiment, the original size of the cache, since the cache at the outset is set to a large size. e_actsqrows is a data member holding the actual number of cache rows currently in use; this number is typically adjusted dynamically. The data member e_nextchck stores information specifying circumstances in which to invoke methods for evaluating whether to adjust the size of the cache. It stores one of four values: 1, 2, 10, and 0. These values are employed to control when actual evaluation of the cache statistics is undertaken.

The E_SQCACHE structure includes housekeeping data members. When the cache structure is first created there exists a list of free space—that is, space that can be used but which is currently not in use. This is available from the pointer *e_resfreelist. A second pointer, *e_rescache, points to the actual rows in the cache which are in use. Another pointer, *e_lastrow, points to the last row in use in the cache. As the cache size dynamically adjusts, this pointer will be adjusted accordingly. Once the cache has reached its full size, this pointer points to the end of the cache. Since the pointer points to the tail end, it is employed to find which row to replace when updating a cache which is full.

Finally, the *e_rescache pointer of E_SQCACHE points to the first row in the cache. A row itself is described as follows:

```
** SQROW is used to identify a row in the subquery cache, by pointing
** to the first SQCONST in the list which holds the correlation and
** result values. SQROWS are joined in a doubly linked list to build
** the cache.
*/
typedef struct e_sqrow
{
    struct e_sqrow      *e_prevrow;   /* Previous entry in list */
    struct e_sqrow      *e_subqnext;  /* Netx entry in list */
    struct e_sqconstant *e_sqconst;
} SQROW;
```

The structure representing one row of the cache thus includes "previous" and "next" pointers for forming a chain (doubly-linked list) of cache rows. In this manner, rows of the cache can be logically moved around, for example for "aging" lesser-used entries, by simply performing pointer fixups.

The row structure in turn points to a structure of type SQCONST:

```
/*
** SQCONST is a stripped down version of CONSTANT, with only those
** fields needed for the subquery cache (to save space) plus an
** additional pointer field to allow linking SQCONSTs into a cache
** row.
*/
typedef struct e_sqconstant
{
    struct e_sqconstant *sqcnext;
    BYTE                *value;
    int                 len;
    BYTE                type;
} SQCONST;
```

In each cache row, there is one SQCONST for each correlation column in the subquery, and one SQCONST to hold the result of the subquery for the corresponding correlation column values.

In addition to the above data structures, helpful constants/ flags may be defined as follows:

```
/* The following status bits are used to describe the state of the subquery
** cache during runtime. They are used by the dynamic-cache-size
algorithmn
** to control and/or fix the size of the subquery cache based upon the
** number of hits and misses at evaluation time.
*/
#define ESQ_DONT_CACHE  0x00000001 /* No caching */
#define    ESQ_DONT_ADJUST   0x00000002 /* Don't call the routine
                                        ** to adjust the cache size.
                                        */
#define    ESQ_DONT_GROW     0x00000004 /* Freeze the cache size */
/* The next three defines are set to determine when sq_adjust_cache()
** should be called to decide whether to adjust the subquery cache size.
** They are in units of the maximum size of the cache in rows,
** e_maxsqrows.
*/
# define SQ_ADJUST_1ST_TIME     1
# define SQ_ADJUST_2ND_TIME     2
# define SQ_ADJUST_3RD_TIME     10
/* The next three defines are different values for the number of
** rows in a fixed-size subquery cache.
*/
# define SQ_VERYSMALLCACHE      1
# define SQ_SMALLCACHE          5
# define SQ_NOTSOSMALLCACHE     50
```

B. Methods

The entry point for the subquery execution methods is an e_exec_subquery method or function, which may be recursively called in instances of nested subqueries. The function may be constructed as follows:

```
/*
** E_EXEC_SUBQUERY
**
**      Coordinate the execution of subqueries.
**
** Parameters:
**      e_subquery   - Top of execution plan for a subquery block.
**      estmt        - E_STMT containing this subquery block.
**
** Returns:
**      Nothing.
**
*/
void
s_exec_subquery(E_SUBQUERY *e_subquery, E_STMT *estmt)
{
        int             flag;
        SYB_BOOLEAN execute_ret;       /* Return code from execute() */
        flag = 0;
        /* If caching is switched off, skip calling sq_search_cache to
        ** search the cache.
        */
        if (!(e_subquery->e_cache.e_sqcstatus & ESQ_DONT_CACHE))
        {
                /*
                ** If trace flag EXEC-55 is set, we will always
                ** execute the query, and then compare the result
                ** to what is in the cache (if there is anything
                ** that matches the correlation columns).
                */
                if (!TRACE(EXEC, 55))
                {
                        if (sq_search_cache(e_subquery, TRUE) == TRUE)
                        {
                                /* Found a match in the cache, done */
                                return;
                        }
                }
        }
        /* Ignore return code from execute(), as a FALSE return code is
        ** only returned from the backout code and the error handlers
        ** are not installed for a subquery block.
        */
        /* Actually execute the subquery */
        execute_ret = execute(estmt, e_subquery->e_sqplan, SELECT, &flag);
```

```
            /* If execute was successful, store result in cache */
            if (execute_ret == TRUE &&
                (!(e_subquery->e_cache.e_sqcstatus & ESQ_DONT_CACHE)))
            {
                sq_add_to_cache(e_subquery);
            }
}
```

The method, which is invoked with a (pointer to) subquery descriptor *e_subquery, proceeds as follows. First, the method tests whether a "don't cache" flag has been set. In the instance where this flag has been set, the method will "short circuit" the caching process—that is, switch off caching completely. Recall that as the system is dynamically determining how to adjust cache size it may in certain instances (e.g., in the above-described Phase III) determine that the cache is of no use (e.g., no "hits"). At this point, therefore, a test is made to determine whether this "don't cache" condition in fact exists. Otherwise (i.e., "don't cache" is not set), the method proceeds to search the subquery cache in an effort to find a match to the value or values passed in.

If the "don't cache" flag is not set, the method invokes sq_search_cache. The method may be constructed as follows.

```
/*
** SQ_SEARCH_CACHE
**
**      Search a subquery cache for a row with matching correlation
**      column values. If found, the result column value of the
**      subquery is copied to esubq->e_sqresult->left.
**
** Parameters:
**      esubq           - E_SUBQUERY contain the subquery cache.
**      replace         - If TRUE, copy the result into esubq->e_sqresult->left
**                        without checking what is already there (normal mode).
**                        If FALSE (only when trace flag 55 is set), compare
**                        what's in esubq->e_sqresult->left to what is in the
**                        cache and print an error if they differ.
**
** Returns:
**      TRUE    - if a matching row was found in the cache.
**      FALSE   - if no matching row was found in the cache.
**
*/
SYB_STATIC SYB_BOOLEAN
sq_search_cache(E_SUBQUERY *esubq, SYB_BOOLEAN replace)
{
            E_SQCACHE       *esqc;          /* Points to subq cache data */
            CONSTLIST       *corptr;        /* To scan the list
                                            ** of correlation values
                                            */
            SQCONST         *cacheptr;      /* To scan the correlation values
                                            ** of each row in the cache.
                                            */
            SQROW           *resptr;        /* to scan the rows in the cache */
            SYB_BOOLEAN     ret;            /* return value, TRUE == success */
            CONSTANT        *constp;        /* Used to save dereferencing */
            int             same;           /* Keep track of comparison
                                            ** between execution result and
                                            ** cached result for trace flag 55.
                                            */
            int             lrudepth;       /* Keep track of how far down the
                                            ** LRU list the matching row lies
                                            */
            ret = FALSE;
            esqc = &(esubq->e_cache);
            if (TRACE(EXEC, 20))
            {
                sq_print_cache(esubq);
            }
            lrudepth = 0;
            /* March down the rows in the subq cache. */
            for (resptr = esqc->e_rescache; resptr; resptr = resptr->e_subqnext)
            {
                /*
                ** March through the correlation values of this cache row
                ** and compare them to the values for the current execution.
                */
                for (corptr = esubq->e_sqcorrlist, cacheptr = resptr->e_sqconst;
```

```
                corptr; corptr = corptr->clnext,
                cacheptr = cacheptr->sqcnext)
        {
                esqc->e_cache_cmps++;
                constp = corptr->clconst;
                /*
                ** If this is a char-type, use STR_EQ,
                ** otherwise use MEM_EQ.
                */
                if (ISCHARTYPE(constp->type))
                {
                        if (!STR_EQ(constp->value, constp->len,
                                cacheptr->value, cacheptr->len))
                        {
                                /* Match not found, go to next row */
                                break;
                        }
                }
                else
                {
                        if (!MEM_EQ(constp->value, constp->len,
                                cacheptr->value, cacheptr->len))
                        {
                                /* Match not found, go to next row */
                                break;
                        }
                }
        }
        if (corptr == NULL)
        {
                SYB_ASSERT((cacheptr->sqcnext == NULL));
                /*
                ** Success: corptr is NULL, but cacheptr
                ** should now be pointing to the CONSTANT
                ** which holds the subquery result value
                ** for the set of correlation columns which
                ** have just been matched.
                */
                constp = (CONSTANT *)(esubq->e_sqresult->left);
                if (replace)
                {
                        constp->len = cacheptr->len;
                        if (constp->len > 0)
                        {
                                /* Move this result from the
                                ** cache to the subquery result
                                ** structure.
                                */
                                MEMMOVE(cacheptr->value,
                                        constp->value, constp->len);
                        }
                        /* Move this row to the top of the LRU list */
                        sq_top_of_cache(esqc, resptr, TRUE);
                }
                else
                {
                        /* House keeping for trace purposes */
                        // ...
                }
                /* Found match, set return value to TRUE */
                ret = TRUE;
                break;
        }
        /* Increment counter for tracking depth of cache row */
        lrudepth++;
}
/* If we found a matching row in the cache */
if (ret == TRUE)
{
        /* Increment the number of hits */
        esqc->e_sqhits++;
        if (lrudepth > esqc->e_lru_maxdepth)
        {
                /*
                ** This hit came for a row that was deeper
                ** (further down) the LRU list than the
                ** previous deepest hit, so update the stats.
                */
                esqc->e_lru_maxdepth = lrudepth;
        }
```

```
            }
            else
            {
                    /* Increment the number of misses */
                    esqc—>e_sqmisses++;
            }
            /* Check and adjust cache size if needed */
            if (!(esqc—>e_sqcstatus & ESQ_DONT_ADJUST) &&
                (esqc—>e_sqmisses == esqc—>e_nextchck))
            {
                    sq_adjust_cache(esqc, esubq);
            }
            return(ret);
}
```

The method, which is invoked with a subquery descriptor, performs a lookup in the cache for the value or values passed in from the subquery. In operation, the search cache function scans the cache sequentially starting from the top. For each row, all of the elements in e_sqcorrlist are compared to the corresponding elements in the cache. If a match is found, the method breaks out of its "for" loop which was performing the sequential scan. When a corrlist value is compared against a corresponding item in the cache, as soon as values are found which do not match, the sequential scan may proceed to the next row (as that row under examination cannot match all values passed in from the subquery). In the instance where a match is found, the result in the subquery cache is retrieved. Additionally, the row which matches is moved (logically) up to the top of the cache. The retrieved result value itself is stored in the subquery structure. Also upon achieving a match or "hit," the LRU max depth data member (e_lru_maxdepth) is updated to reflect the depth of the matching row, in the event that that row is deeper than any previously matching row. The number of "hits" counter is also incremented at this point for tracking that statistic.

In the case where no match is found, the method enters an "else" branch. Here, the method will increment the number of "misses" counter, for updating that statistic. At this point, every time the system has searched the cache it checks to determine whether it needs to invoke the method which checks cache statistics, for dynamically adjusting cache size. This check is made by testing the "don't adjust" flag. If adjustment has not been switched off (i.e., "don't adjust" flag is false) and the number of "misses" equals e_nextchk, the system then calls sq_adjust_cache which examines the statistics and decides what to do (if anything) for the cache size.

sq_adjust_cache may be constructed as follows:

```
/*
**   SQ_ADJUST_CACHE
**
**           Dynamically adjust the number of rows in the subquery cache,
**           if necessary. This function may be called more than once.
**           The first time it is called is when the subquery cache has
**           been completely filled (esqc—>e_sqmisses == esqc—>e_maxsqrows).
**               At this time, if there are no cache hits, the cache size
**               will be reduced and fixed at one row, and the cache will
**               be tested again, when '10 * esqc—>e_maxsqrows' cache misses
**               have been seen.
**
**               If there are cache hits, but they always match the top
**               row of the LRU list, the cache is reduced and fixed at one
**               row, and will not be checked again.
**
**               All other cases are marked to be checked again when
**               '2 * esqc—>e_maxsqrows' cache misses have been seen.
**
**           If this function is called with
**               esqc—>e_sqmisses/esqc—>e_maxsqrows == 2, the maximum lru
**           depth is checked against the cache size. If this depth is
**           less than esqc—>e_maxsqrows/2, the cache size is reduced and
**           fixed at the maximum lru depth used + 1.
**
**           If this function is called with
**               esqc—>e_sqmisses/esqc—>e_maxsqrows == 10, and there are still
**           no cache hits, the cache is dropped for the rest of the query.
**
**   Parameters:
**           esqc    - E_SQCACHE for the subquery cache.
**           esubq   - E_SUBQUERY with the subquery number.
**
**   Returns:
**           Nothing.
**
*/
SYB_STATIC void
sq_adjust_cache (E_SQCACHE *esqc, E_SUBQUERY *esubq)
{
```

```
switch (esqc—>e_sqmisses / esqc—>e_maxsqrows)
{
    case SQ_ADJUST_1ST_TIME:
        if (esqc—>e_sqhits == 0)
        {
            /* Reduce cache to 1 row */
            sq_trunc_cache(esqc, 1);
            /* Make sure cache does not grow anymore */
            esqc—>e_sqcstatus |= ESQ_DONT_GROW;
            /* Check cache again after 10 cache fulls */
            esqc—>e_nextchck =
                SQ_ADJUST_3RD_TIME * esqc—>e_maxsqrows;
            break;
        }
        if (esqc—>e_lru_mvs == 0)
        {
            /* Got some hits, but always with the top
            ** of the cache, so reduce cache to 1 row.
            */
            sq_trunc_cache(esqc, 1);
            /* Make sure cache doesn't grow, and don't
            ** even call this function again.
            */
            esqc—>e_sqcstatus |=
                (ESQ_DONT_GROW | ESQ_DONT_ADJUST);
            break;
        }
        /* Check again after another cache full of misses */
        esqc—>e_nextchck = (SQ_ADJUST_2ND_TIME * esqc—>e_maxsqrows);
        break;
    case SQ_ADJUST_2ND_TIME:
        /* If the full depth of the cache is not being used,
        ** reduce it, to make searching it more efficient.
        */
        if (esqc—>e_lru_maxdepth < (esqc—>e_maxsqrows / 2))
        {
            sq_trunc_cache(esqc, esqc—>e_lru_maxdepth + 1);
        }
        esqc—>e_sqcstatus |= (ESQ_DONT_GROW | ESQ_DONT_ADJUST);
        break;
    case SQ_ADJUST_3RD_TIME:
        if (esqc—>e_sqhits == 0)
        {
            /* No hits after 10 times the cache size in
            ** misses, so drop the cache completely.
            */
            esqc—>e_sqcstatus = ESQ_DONT_CACHE;
            esqc—>e_actsqrows = 0;
        }
        break;
    default:
        break;
}
}
```

The method operates as follows. In a preferred embodiment, there are three situations in which this function can be called: the cache is filled one time, the cache is filled two times, and the cache is filled ten (or other pre-selected threshold value) times. The method switches (i.e., enters a "switch" statement), therefore, on the ratio of misses to original cache size. If the ratio is one, then it is the first time. If the ratio is two, then it is the second time. If the ratio is ten, then it is the third time.

For the first time, the method looks at the number of "hits." If there have been no "hits," the method at this point truncates the cache to one row. Additionally, the status flag is set to make sure that the cache will not grow any more. After setting the status to make sure that the cache will not grow any more, the method also at this point sets e_nextchk to indicate that this method should be called again (for the check in Phase III).

The next case is where there are hits but nothing has moved in the cache (or equivalently the maximum LRU Depth is one). In other words, this is the case where there are hits but the hits occur always at the top of the cache. Here, the cache is reduced in size to one row. Additionally, flags are set to make sure that the cache does not grow ("don't grow" flag) and that the cache does not adjust ("don't adjust" flag). The latter specifies that this method will not be called in the future since further adjustment to the cache is not desired. For all other cases—ones which do not fall into "no hits" or "no moves"—e_chknext is set to specify that the method should be called again after the cache has been filled twice. This concludes the first pass through this method.

If this function or method is invoked after the cache has been filled twice, statistics are examined to determine whether the full depth of the cache is being used; if not, it will be reduced. In particular, the maximum LRU Depth is compared to the maximum number of rows divided by two. In the instance where the maximum LRU Depth is less, the system proceeds to set the maximum number of rows equal to the maximum LRU Depth plus 1. The method then, for all cases, sets flags indicating "don't grow" and "don't adjust." Hence, if the method is called a second time, it will be the last time the method is called. If the method is called a third time, all it does is check to see whether "hits" are still zero.

If no "hits" remain at this point, caching is switched off by setting a "don't cache" flag.

At the conclusion of the above methods, the system performs any desired cleanup. The cache may, for instance, be freed.

Advantages

By tracking the above-described statistics, the present invention can optimize the cache size based on the actual data encountered during runtime execution. Consider, for example, a data set comprising 100,000 data records storing 14 unique values, with the values themselves appearing in the data records in an entirely random fashion. The approach by the present invention, therefore, is to adjust the size of the cache at execution time based on the statistics of what has already happened with the cache for the data which has been encountered. Here, 14 cache "misses" will occur, yet this is coupled with nearly 100,000 "hits" occurring. At the same time, cache space which is not needed is freed up. As a result of these and other advantages, the approach of the present invention achieves dramatically better results than available with prior art systems.

Appended herewith is an Appendix containing source code listings in the C Programming Language providing additional description of the present invention. A suitable C compiler for compiling the source listings is available from several vendors, including Microsoft of Redmond, Wash. and Borland International of Scotts Valley, Calif.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

```
/*
** E_SUBQUERY
**
** This structure is used by the E_RUNSUBQ eval to execute a subquery.
** It is linked off the E_STEP
*/
typedef struct e_subquery
{
        struct e_subquery *e_sqnext;   /* Next subquery in E_STMT */
        int               e_sqpredicate;   /* subquery predicate */ struct e_step     *e_sqplan;   /* Steps needed to execute
                                      ** this subquery. */ struct tree       *e_sqresult;     /* Result value for this subq */ struct constlist  *e_sqcorrlist;   /* List of CONSTANTs containing
                                      ** values of correlation cols.
                                      */
        struct e_sqcache  e_cache;     /* The data for the cache
                                      ** for this subquery.
                                      */
        /*
        ** Linked list of J_CACHE_USED structures describing the maximum
        ** buffer pool usage across all the CMD nodes in this subquery.
        ** See decision.h for a picture of how this field is used.
        */
        BYTE              *e_sqBufferCacheUsed;

subqid_t          e_sqNumber; /* Subquery number */
        sqlevel_t         e_sqLevel;  /* Subquery level */
        short             e_sqLineNumber;   /* line  subquery appears on */
        BYTE              spare[4];
} E_SUBQUERY;

/* The next three structures are used in the subquery-result cache */
/*
 ** SQCONST is a stripped down version of CONSTANT, with only those
 ** fields needed for the subquery cache (to save space) plus an
 ** additional pointer field to allow linking SQCONSTs into a cache
 ** row.  In each cache row, there is one SQCONST for each correlation
 ** column in the subquery, and one SQCONST to hold the result of the
 ** subquery for the corresponding correlation column values.
 */
typedef struct e_sqconstant
{
        struct e_sqconstant    *sqcnext;
        BYTE                   *value;
```

```
            int             len;
            BYTE            type;
    } SQCONST;

/*
    ** SQROW is used to identify a row in the subquery cache, by pointing
    ** to the first SQCONST in the list  which holds the correlation and
    ** result values.  SQROWS are joined in a doubly linked list to build
    ** the cache.
    */
    typedef struct e_sqrow
    {
            struct e_sqrow          *e_prevrow; /* Previous entry in list */
            struct e_sqrow          *e_subqnext;/* Netx entry in list */
            struct e_sqconstant     *e_sqconst;
    } SQROW;

/*
    ** E_SQCACHE is used to group the subquery-cache variables within
    ** the E_SUBQUERY structure.
    */
    typedef struct e_sqcache
    {
            struct e_sqrow    *e_resfreelist; /* List of rows which are still
                                      ** available for the subq cache.
                                      */
            struct e_sqrow    *e_rescache;    /* The first row in the cache   */
            struct e_sqrow    *e_lastrow; /* Oldest row in the cache */
            int               e_sqhits;   /* Number of cache hits for 'set
                                      ** statistics subquerycache on'.
                                      */
            int               e_sqmisses; /* Number of cache misses for 'set
                                      ** statistics subquerycache on'.
                                      */
            int               e_lru_mvs;  /* Number of times a row was moved
                                      ** up in the LRU cache.
                                      */
            int               e_cache_cmps;   /* Number of compares in cache */
            int               e_sqcstatus;    /* Status field for cache */
            short             e_maxsqrows;    /* Number of configured cache rows */
            short             e_actsqrows;    /* Number of actual(used) cache rows */
            short             e_nextchck; /* Number of misses when next to
                                      ** check whether to adjust cache size.
                                      */
            short             e_lru_maxdepth;    /* Maximum depth, from the top of
                                      ** the cache where a hit occurred.
                                      */
            int               e_sparel;
    } E_SQCACHE;

/* The following status bits are used to describe the state of the subquery
```

```
**    cache during runtime.  They are used by the dynamic-cache-size
algorithmn
**    to control and/or fix the size of the subquery cache based upon the
**    number of hits and misses at evaluation time.
*/
#define ESQ_DONT_CACHE   0x00000001  /* No caching */
#define    ESQ_DONT_ADJUST   0x00000002  /* Don't call the routine
                                         ** to adjust the cache size.
                                         */
#define    ESQ_DONT_GROW     0x00000004  /* Freeze the cache size */

/* The next three defines are set to determine when sq_adjust_cache()
** should be called to decide whether to adjust the subquery cache size.
** They are in units of the maximum size of the cache in rows,
** e_maxsqrows.
*/
# define SQ_ADJUST_1ST_TIME   1
# define SQ_ADJUST_2ND_TIME   2
# define SQ_ADJUST_3RD_TIME   10

/* The next three defines are different values for the number of
** rows in a fixed-size subquery cache.
*/
# define SQ_VERYSMALLCACHE    1
# define SQ_SMALLCACHE        5
# define SQ_NOTSOSMALLCACHE   50

SYB_STATIC SYB_BOOLEAN   sq_search_cache  PROTO((E_SUBQUERY *, SYB_BOOLEAN));
SYB_STATIC void          sq_add_to_cache  PROTO((E_SUBQUERY *));
SYB_STATIC void          sq_print_cache   PROTO((E_SUBQUERY *));
SYB_STATIC void          sq_printcorrow   PROTO((E_SUBQUERY *));
SYB_STATIC void          sq_top_of_cache  PROTO((E_SQCACHE *, SQROW *,
                                           SYB_BOOLEAN));
SYB_STATIC void          sq_trunc_cache   PROTO((E_SQCACHE *, int));
SYB_STATIC void          sq_adjust_cache  PROTO((E_SQCACHE *, E_SUBQUERY
*));

/*
**   EXECSUBQ.C
**
**   Functions specific to the execution of subqueries and the
**   administration of the subquery cache.
**
**
**   Functions in this file:
**
**      e_exec_subquery    - called from run() to execute a subquery block.
**      sq_add_to_cache    - add a new row to the subquery cache.
**      sq_adjust_cache    - decide whether to change the size (# rows) in
**                          the subq cache, based upon data which has
```

```
**                     already been processed.
**    sq_print_cache       - print out a subquery cache.
**    sq_search_cache      - searches rows in the subquery cache to find a
**                     match to the given correlation column values.
**    reset_all_sqcache - given an E_STEP, reset the caches for all
**                     subqueries hung off of that E_STEP.
**    reset_sqcache        - reset a single subquery cache.
**    send_sqstats         - send cache statistics -- used in 'set
statistics
**                     subquerycache on' command.
**    sq_printcorrow       - print the search correlation values and the
**                     result of subquery execution.  Use as a
**                     diagnostic when trace flag 555 is on.
**    sq_top_of_cache      - move a row to the top of the LRU list in cache.
**    sq_trunc_cache       - Reduce the number of rows in the subq-cache.
**
**
**  Trace flags:
**
**    All trace flags use the EXEC(500) prefix.
**
**    10   Switch caching off.
**    11   Limit cache size to SQ_VERYSMALLCACHE (1) rows.
**    12   Limit cache size to SQ_SMALLCACHE (5) rows.
**    13   Limit cache size to SQ_NOTSOSMALLCACHE (50) rows.
**    20   Print the subquery cache each time it is searched.
**    21   Print cache adjustment data.
**    55   Always execute the subquery and compare results
**         to what is in cache (sanity check).
*/

/*
** E_EXEC_SUBQUERY
**
**    Coordinate the execution of subqueries.
**
**  Parameters:
**    e_subquery  - Top of execution plan for a subquery block.
**    estmt       - E_STMT containing this subquery block.
**
**  Returns:
**    Nothing.
**
*/ void
s_exec_subquery(E_SUBQUERY *e_subquery, E_STMT *estmt)
{
        int         flag;
        SYB_BOOLEAN execute_ret;    /* Return code from execute() */
```

```
                                  34 flag = 0;

/* If caching is switched off, skip calling sq_search_cache to
            ** search the cache.
            */
            if (!(e_subquery->e_cache.e_sqcstatus & ESQ_DONT_CACHE))
            {
                /*
                ** If trace flag EXEC-55 is set, we will always
                ** execute the query, and then compare the result
                ** to what is in the cache (if there is anything
                ** that matches the correlation columns).
                */
                if (!TRACE(EXEC, 55))
                {
                    if (sq_search_cache(e_subquery, TRUE) == TRUE)
                    {
                        /* Found a match in the cache, done */
                        return;
                    }
                }
            }

/* Ignore return code from execute(), as a FALSE return code is
            ** only returned from the backout code and the error handlers
            ** are not installed for a subquery block.
            */
            /* Actually execute the subquery */
            execute_ret = execute(estmt, e_subquery->e_sqplan, SELECT, &flag);

/* If execute was successful, store result in cache */
            if (execute_ret == TRUE &&
                (!(e_subquery->e_cache.e_sqcstatus & ESQ_DONT_CACHE)))
            {
                sq_add_to_cache(e_subquery);
            }

}

/*
    ** SQ_SEARCH_CACHE
    **
    **    Search a subquery cache for a row with matching correlation
    **    column values.  If found, the result column value of the
    **    subquery is copied to esubq->e_sqresult->left.
    **
    **    Parameters:
    **      esubq       - E_SUBQUERY contain the subquery cache.
    **      replace     - If TRUE, copy the result into esubq->e_sqresult->left
    **                    without checking what is already there (normal mode).
```

```
**                 If FALSE (only when trace flag 55 is set), compare
**                 what's in esubq->e_sqresult->left to what is in the
**                 cache and print an error if they differ.
**
** Returns:
**      TRUE  - if a matching row was found in the cache.
**      FALSE - if no matching row was found in the cache.
**
*/
SYB_STATIC SYB_BOOLEAN
sq_search_cache(E_SUBQUERY *esubq, SYB_BOOLEAN replace)
{
        E_SQCACHE       *esqc;          /* Points to subq cache data */
        CONSTLIST       *corptr;        /* To scan the list
                                        ** of correlation values
                                        */
        SQCONST                 *cacheptr;  /* To scan the correlation values
                                        ** of each row in the cache.
                                        */
        SQROW           *resptr;        /* to scan the rows in the cache */
        SYB_BOOLEAN ret;                /* return value, TRUE == success */
        CONSTANT        *constp;        /* Used to save dereferrencing */
        int             same;           /* Keep track of comparison
                                        ** between execution result and
                                        ** cached result for trace flag 55.
                                        */
        int             lrudepth;       /* Keep track of how far down the
                                        ** LRU list the matching row lies
                                        */ ret = FALSE;
        esqc = &(esubq->e_cache);

if (TRACE(EXEC, 20))
        {
                sq_print_cache(esubq);
        } lrudepth = 0;

/* March down the rows in the subq cache. */
        for (resptr = esqc->e_rescache; resptr; resptr = resptr->e_subqnext)
        {
                /*
                ** March through the correlation values of this cache row
                ** and compare them to the values for the current execution.
                */
                for (corptr = esubq->e_sqcorrlist, cacheptr = resptr->e_sqconst;
                        corptr; corptr = corptr->clnext,
```

```
                      cacheptr = cacheptr->sqcnext)
              {
                      esqc->e_cache_cmps++;
                      constp = corptr->clconst;

/*
                      ** If this is a char-type, use STR_EQ,
                      ** otherwise use MEM_EQ.
                      */
                      if (ISCHARTYPE(constp->type))
                      {
                              if (!STR_EQ(constp->value, constp->len,
                                      cacheptr->value, cacheptr->len))
                              {
                                      /* Match not found, go to next row */
                                      break;
                              }
                      }
                      else
                      {
                              if (!MEM_EQ(constp->value, constp->len,
                                      cacheptr->value, cacheptr->len))
                              {
                                      /* Match not found, go to next row */
                                      break;
                              }
                      }
              } if (corptr == NULL)
              {
                      SYB_ASSERT((cacheptr->sqcnext == NULL));

/*
                      ** Success: corptr is NULL, but cacheptr
                      ** should now be pointing to the CONSTANT
                      ** which holds the subquery result value
                      ** for the set of correlation columns which
                      ** have just been matched.
                      */
                      constp = (CONSTANT *)(esubq->e_sqresult->left);
                      if (replace)
                      {
                              constp->len = cacheptr->len;
                              if (constp->len > 0)
                              {
                                      /* Move this result from the
                                      ** cache to the subquery result
                                      ** structure.
                                      */
                                      MEMMOVE(cacheptr->value,
```

37 constp->value, constp->len);
                    }

/* Move this row to the top of the LRU list */
                            sq_top_of_cache(esqc, resptr, TRUE);
                    }
                    else
                    {
                            /* House keeping for trace purposes */
                            // ...
                    }

/* Found match, set return value to TRUE */
                    ret = TRUE;
                    break;
            }
            /* Increment counter for tracking depth of cache row */
            lrudepth++;
    }

/* If we found a matching row in the cache */
    if (ret == TRUE)
    {
            /* Increment the number of hits */
            esqc->e_sqhits++;

if (lrudepth > esqc->e_lru_maxdepth)
            {
                    /*
                    ** This hit came for a row that was deeper
                    ** (further down) the LRU list than the
                    ** previous deepest hit, so update the stats.
                    */
                    esqc->e_lru_maxdepth = lrudepth;
            }
    }
    else
    {
            /* Increment the number of misses */
            esqc->e_sqmisses++;
    }

/* Check and adjust cache size if needed */
    if (!(esqc->e_sqcstatus & ESQ_DONT_ADJUST) &&
        (esqc->e_sqmisses == esqc->e_nextchck))
    {
            sq_adjust_cache(esqc, esubq);
    } return(ret);
}
```

38

```
/*
** SQ_ADD_TO_CACHE
**
**   Add a new row to the subquery cache.  If the cache size is not
**   frozen, and there are any unused rows in resfreelist, use one
**   of them.  If resfreelist is NULL or the cache size is frozen,
**   drop the LRU row in the cache to make space.  After updating the
**   new row, put it at the top of the LRU list.
**   NOTE: If trace flag 55 is set, we first search the cache
**   for a matching set of correlation values, and if found we just
**   return.
**
** Parameters:
**    esubq       - E_SUBQUERY contain the subquery cache.
**
** Returns:
**    Nothing.
**
*/

SYB_STATIC void
sq_add_to_cache(E_SUBQUERY *esubq)
{
        E_SQCACHE    *esqc;              /* Subq cache data & cache */
        CONSTLIST    *corptr;    /* To scan the list
                                 ** of correlation values
                                 */
        SQCONST              *cacheptr;  /* To scan the correlation values
                                         ** in the new row of the cache.
                                         */
        SQROW        *resptr;    /* to scan the rows in the cache */
        CONSTANT     *constp;    /* Used to save dereferrencing */ esqc = &(esubq->e_cache);

if (TRACE(EXEC, 55) && !(esqc->e_sqcstatus & ESQ_DONT_CACHE))
        {
                if (sq_search_cache(esubq, FALSE) == TRUE)
                {
                        /* There already is a cache row for this
                        ** set of correlation-column values.
                        */
                        return;
                }
        }

/*
        ** If the cache size is not frozen, check for
        ** free space to put this row
```

39

```
       */
       if (!(esqc->e_sqcstatus & ESQ_DONT_GROW) && esqc->e_resfreelist)
       {
               /* Remove this row from the freelist */
 5             resptr = esqc->e_resfreelist;
               esqc->e_resfreelist = resptr->e_subqnext;

/* If this is the very first row, set e_lastrow */
               if (esqc->e_rescache == NULL)
10             {
                       esqc->e_lastrow = resptr;
               }
               else
               {
15                     /* Make the previous top row point to resptr */
                       esqc->e_rescache->e_prevrow = resptr;
               }

/* Insert resptr at the top of the LRU cache */
20             resptr->e_subqnext = esqc->e_rescache;
               esqc->e_rescache = resptr;
               esqc->e_actsqrows++;

/* If we are running with a fixed cache size, and we
25             ** have reached the specified size, freeze the cache
               */
               if (TRACE(EXEC, 11))
               {
                       if (esqc->e_actsqrows == SQ_VERYSMALLCACHE)
30                     {
                               esqc->e_sqcstatus |= ESQ_DONT_GROW;
                       }
               }
               else if (TRACE(EXEC, 12))
35             {
                       if (esqc->e_actsqrows == SQ_SMALLCACHE)
                       {
                               esqc->e_sqcstatus |= ESQ_DONT_GROW;
                       }
40             }
               else if (TRACE(EXEC, 13))
               {
                       if (esqc->e_actsqrows == SQ_NOTSOSMALLCACHE)
45                     {
                               esqc->e_sqcstatus |= ESQ_DONT_GROW;
                       }
               }
       }
       else
50     {
               /* Use the LRU (oldest) row */
```

```
                    resptr = esqc->e_lastrow;

/* Move this row to the front of the LRU list */
                    sq_top_of_cache(esqc, resptr, FALSE);
 5          }

/*
            ** March through the correlation column list and copy the
            ** current values into this subq cache row.
10          */
            for (corptr = esubq->e_sqcorrlist, cacheptr = resptr->e_sqconst;
                 corptr; corptr = corptr->clnext, cacheptr = cacheptr->sqcnext)
            {
                if (corptr->clconst->len > 0)
15              {
                        MEMMOVE(corptr->clconst->value, cacheptr->value,
                                corptr->clconst->len);
                }
                cacheptr->len = corptr->clconst->len;
20          }

/* Now save the subquery result */
            constp = (CONSTANT *)(esubq->e_sqresult->left);
            if (constp->len > 0)
25          {
                    MEMMOVE(constp->value, cacheptr->value, constp->len);
            }
            cacheptr->len = constp->len;
        }
30

/*
        ** SQ_TOP_OF_CACHE
        **
35      **    Move a cache-row to the top of the LRU list.
        **
        **    Parameters:
        **       esubq     - E_SUBQUERY contain the subquery cache.
        **       resptr    - SQROW      pointing to the row to be put on top.
40      **       cnt_it    - If TRUE, increment e_cache->e_lru_mvs (the
        **                   count of the number of times a row was found,
        **                   which was not the top of the LRU list.
        **
        **    Returns:
45      **       Nothing.
        **
        */

SYB_STATIC void
50      sq_top_of_cache(E_SQCACHE *esqc, SQROW *resptr, SYB_BOOLEAN cnt_it)
        {
```

41

```
         /* Is resptr already at the top of the LRU list? */
         if (resptr == esqc->e_rescache)
         {
              return;
         }

/* Remove resptr from it's current place in the LRU list */
         resptr->e_prevrow->e_subqnext = resptr->e_subqnext;
         if (resptr != esqc->e_lastrow)
         {
              resptr->e_subqnext->e_prevrow = resptr->e_prevrow;
         }
         else
         {
              esqc->e_lastrow = resptr->e_prevrow;
         } resptr->e_subqnext = esqc->e_rescache;
         esqc->e_rescache->e_prevrow = resptr;
         esqc->e_rescache = resptr;
         resptr->e_prevrow = NULL;

if (cnt_it)
         {
              esqc->e_lru_mvs++;
         }
    }

/*
    ** SQ_ADJUST_CACHE
    **
    **   Dynamically adjust the number of rows in the subquery cache,
    **   if necessary.  This function may be called more than once.
    **   The first time it is called is when the subquery cache has
    **   been completely filled (esqc->e_sqmisses == esqc->e_maxsqrows).
    **     At this time, if there are no cache hits, the cache size
    **     will be reduced and fixed at one row, and the cache will
    **     be tested again, when '10 * esqc->e_maxsqrows' cache misses
    **     have been seen.
    **
    **     If there are cache hits, but they always match the top
    **     row of the LRU list, the cache is reduced and fixed at one
    **     row, and will not be checked again.
    **
    **     All other cases are marked to be checked again when
    **     '2 * esqc->e_maxsqrows' cache misses have been seen.
    **
    **   If this function is called with
    **   esqc->e_sqmisses/esqc->e_maxsqrows == 2, the maximum lru
    **   depth is checked against the cache size.  If this depth is
```

```
**      less than esqc->e_maxsqrows/2, the cache size is reduced and
**      fixed at the maximum lru depth used + 1.
**
**      If this function is called with
**         esqc->e_sqmisses/esqc->e_maxsqrows == 10, and there are still
**      no cache hits, the cache is dropped for the rest of the query.
**
**  Parameters:
**      esqc  - E_SQCACHE for the subquery cache.
**      esubq - E_SUBQUERY with the subquery number.
**
**  Returns:
**      Nothing.
**
*/

SYB_STATIC void
sq_adjust_cache(E_SQCACHE *esqc, E_SUBQUERY *esubq)
{
        switch (esqc->e_sqmisses / esqc->e_maxsqrows)
        {
          case SQ_ADJUST_1ST_TIME:

if (esqc->e_sqhits == 0)
                {
                        /* Reduce cache to 1 row */
                        sq_trunc_cache(esqc, 1);

/* Make sure cache does not grow anymore */
                        esqc->e_sqcstatus |= ESQ_DONT_GROW;

/* Check cache again after 10 cache fulls */
                        esqc->e_nextchck =
                                SQ_ADJUST_3RD_TIME * esqc->e_maxsqrows;
                        break;
                } if (esqc->e_lru_mvs == 0)
                {
                        /* Got some hits, but always with the top
                        ** of the cache, so reduce cache to 1 row.
                        */
                        sq_trunc_cache(esqc, 1);

/* Make sure cache doesn't grow, and don't
                        ** even call this function again.
                        */
                        esqc->e_sqcstatus |=
                                (ESQ_DONT_GROW | ESQ_DONT_ADJUST);
                        break;
```

43

```
                    }

/* Check again after another cache full of misses */
                    esqc->e_nextchck = (SQ_ADJUST_2ND_TIME * esqc->e_maxsqrows);
                    break;

case SQ_ADJUST_2ND_TIME:

/* If the full depth of the cache is not being used,
                    ** reduce it, to make searching it more efficient.
                    */
                    if (esqc->e_lru_maxdepth < (esqc->e_maxsqrows / 2))
                    {
                            sq_trunc_cache(esqc, esqc->e_lru_maxdepth + 1);
                    } esqc->e_sqcstatus |= (ESQ_DONT_GROW | ESQ_DONT_ADJUST);
                    break;

case SQ_ADJUST_3RD_TIME:

if (esqc->e_sqhits == 0)
                    {
                            /* No hits after 10 times the cache size in
                            ** misses, so drop the cache completely.
                            */
                            esqc->e_sqcstatus = ESQ_DONT_CACHE;
                            esqc->e_actsqrows = 0;
                    }
                    break;

default:

break;
            }
    }

/*
    ** SQ_TRUNC_CACHE
    **
    **   Reduce the active size of the subquery cache.
    **
    **   Parameters:
    **       esqc      - E_SQCACHE for the subquery cache.
    **       row_count - Cache size, in rows, to reduce to.
    **
    **   Returns:
    **       Nothing.
    **
    */
```

44

```
            SYB_STATIC void
            sq_trunc_cache(E_SQCACHE *esqc, int row_count)
            {
                    int             i;
  5                 SQROW           *resptr;

/* If there are less rows in the cache than we want
                    ** to trim to, return.
                    */
 10                 if (row_count >= esqc->e_actsqrows)
                    {
                            return;
                    }

15                 if (row_count == 0)
                    {
                            /* Remove the whole cache */
                            resptr = esqc->e_rescache;
                            esqc->e_lastrow->e_subqnext = esqc->e_resfreelist;
 20                         esqc->e_resfreelist = resptr;
                            esqc->e_lastrow = NULL;
                            esqc->e_rescache = NULL;
                    }
                    else
 25                 {
                            /* Reduce the number of rows in the cache to row_cnt.
                            ** Skip the first 'row_cnt' rows, then remove
                            ** everything that comes afterwards.
                            */
 30                         resptr = esqc->e_rescache;

for (i = 0; i < row_count; i++)
                            {
                                    resptr = resptr->e_subqnext;
 35                         }

/* resptr now points to the first row to drop, so
                            ** move it and all following rows to the freelist.
                            */
 40                         esqc->e_lastrow->e_subqnext = esqc->e_resfreelist;
                            esqc->e_resfreelist = resptr->e_subqnext;
                            resptr->e_subqnext = NULL;
                            esqc->e_lastrow = resptr;
                    }
 45                 esqc->e_actsqrows = row_count;
            }

/*
 50         ** RESET_ALL_SQCACHE
            **
```

```
                               45
**      Re-initialize all of the subquery caches hanging off of
**      an E_STEP and all of its subordinate E_STEPs.
**
**      Parameters:
**         emain        - E_STEP to start with.
**
**      Returns:
**         Nothing.
**
*/ void
reset_all_sqcache(E_STEP *emain)
{
        E_STEP          *em;
        E_STEP          *estep;
        E_SUBQUERY      *subq;

/*
        ** Check for stack overflow in this recursive routine.
        ** This must appear immediately after the declarations.
        */
        CHECKSTACKOFLOW;

for (em = emain; em; em = em->e_stnext)
        {
                /* search this main estep and it's subordinates */
                for (estep = em; estep; estep = estep->e_stsubor)
                {
                        /* search this estep's subqueries if any */
                        for (subq = estep->e_stsubqlist; subq;
                                subq = subq->e_sqnext)
                        {
                                reset_sqcache(&(subq->e_cache));
                                reset_all_sqcache(subq->e_sqplan);
                        }
                }
        }
        return;
}

/*
** RESET_SQCACHE
**
**      Re-initialize a subquery cache.
**
**      Parameters:
**         esqc    - E_SQCACHE to be re-initialized.
**
**      Returns:
```

```
**      Nothing.
**
*/
void
reset_sqcache(E_SQCACHE *esqc)
{
        if (esqc->e_rescache != NULL)
        {
                /* Move the rows from e_rescache to e_resfreelist */
                esqc->e_lastrow->e_subqnext = esqc->e_resfreelist;
                esqc->e_resfreelist = esqc->e_rescache;
        }

/* Initialize the list of used cache rows */
        esqc->e_rescache = NULL;
        esqc->e_lastrow = NULL;
        esqc->e_actsqrows = 0;
        esqc->e_sqcstatus = 0;
        esqc->e_nextchck = (SQ_ADJUST_1ST_TIME * esqc->e_maxsqrows);

/* Initialize values for 'set statistics' command. */
        esqc->e_sqhits = 0;
        esqc->e_sqmisses = 0;
        esqc->e_lru_mvs = 0;
        esqc->e_lru_maxdepth = 0;
        esqc->e_cache_cmps = 0;

if (TRACE(EXEC, 11) || TRACE(EXEC, 12) || TRACE(EXEC, 13))
        {
                /* If we are running with a fixed cache size,
                ** make sure it stays that way, by switching off
                ** the adjusting algorithmn.
                */
                esqc->e_sqcstatus = ESQ_DONT_ADJUST;
        }
        else if (TRACE(EXEC, 10))
        {
                /* Caching is switched off, set the status */
                esqc->e_sqcstatus = ESQ_DONT_CACHE;
        } return;
}

/*
** SEND_SQSTATS
**
**      Recursively scan a chain of E_STEPS and for each subquery
**      cache found, print out the cache size, number of hits and
```

```
**      misses occurred during execution.
**
**      Parameters:
**          emain     - E_STEP to start looking on.
**          stmntno   - statement number of the E_STMT which holds emain.
**          send      - If TRUE, called from 'set statistics subquerycache on',
**                      and a summary of the subq cache statistics are printed
**                      through ex_callprint().
**                      If FALSE, call sq_print_cache(). This mode is not
**                      called from anywhere in the code, it is here as a tool
**                      to be used for examining the subquery caches in the
**                      debugger.
**
**      Returns:
**          Nothing.
**
*/ void
send_sqstats(E_STEP *emain, short stmntno, SYB_BOOLEAN send)
{
        E_STEP          *em;
        E_STEP          *estep;
        E_SUBQUERY      *subq;
        E_SQCACHE       *esqc;

/*
        ** Check for stack overflow in this recursive routine.
        ** This must appear immediately after the declarations.
        */
        CHECKSTACKOFLOW;

/* For each main E_STEP */
        for (em = emain; em; em = em->e_stnext)
        {
                /* Search this main E_STEP and it's subordinates */
                for (estep = em; estep; estep = estep->e_stsubor)
                {
                        /* Search this E_STEP's subqueries if any */
                        for (subq = estep->e_stsubqlist; subq;
                                subq = subq->e_sqnext)
                        {
                                esqc = &(subq->e_cache);

if (send == TRUE)
                                {
                                        /* Called from s_execute() to
                                        ** send the subquery cache
                                        ** statistics to the user.
                                        */
                                        if (TRACE(EXEC, 21))
```

48
```
                                {
                                        TRACEPRINT("STMNT(%d) SUBQ(%d)
           status(0x%x):\n",
                                                stmntno,
                                                subq->e_sqNumber,
                                                esqc->e_sqcstatus);

TRACEPRINT("   rows(max, used)  (%d, %d)
           hits(%d)\tmisses(%d)\tmvs(%d)\tcmps(%d)\tl_dep(%d)\n",
                                                esqc->e_maxsqrows,
                                                esqc->e_actsqrows,
                                                esqc->e_sqhits,
                                                esqc->e_sqmisses,
                                                esqc->e_lru_mvs,
                                                esqc->e_cache_cmps,
                                                esqc->e_lru_maxdepth);
                                }
                                /* NOTE: We are sending the cache
                                ** statistics to the user, and we
                                ** are going to be a bit tricky,
                                ** to save confusion:  If caching
                                ** was switched off by the dynamic
                                ** cache size algorithm, there will
                                ** still be some cache misses.
                                ** But, we are returning a cache
                                ** size of 0 rows, so we will lie,
                                ** and say there were no misses if
                                ** there are no cache rows at the
                                ** end of the query.
                                */
                                ex_callprint(EX_NUMBER(SYSTEM,
                                                SYS_SQCSTAT),
                                                EX_INFO, 1, stmntno,
                                                subq->e_sqNumber,
                                                esqc->e_actsqrows,
                                                esqc->e_sqhits,
                                                esqc->e_actsqrows == 0 ? 0 :
                                                esqc->e_sqmisses);
                        }
                        else
                        {
                                sq_print_cache(subq);
                        } send_sqstats(subq->e_sqplan, stmntno, send);
                }
            }
        }
}
```

49

```
/*
** SQ_PRINT_CACHE
**
**    Print the contents of a subquery cache.
**
** Parameters:
**    esubq       - E_SUBQUERY containing the cache.
**
** Returns:
**    Nothing.
**
*/

SYB_STATIC void
sq_print_cache(E_SUBQUERY *esubq)
{
        int             i = 1;
        E_SQCACHE       *esqc;
        SQROW           *resptr;
        SQCONST             *cptr;

esqc = &(esubq->e_cache);

TRACEPRINT("CACHE for SUBQ #%d  (size = %d\thit = %d, miss = %d):\n",
                        esubq->e_sqNumber, esqc->e_actsqrows,
                        esqc->e_sqhits, esqc->e_sqmisses);

TRACEPRINT("Cache status: e_sqcstatus: (");
        PRSTATSTR(esqc->e_sqcstatus, E_sqcstatus_str);
        TRACEPRINT(")\n");

resptr = esqc->e_rescache;
        while (resptr)
        {
                TRACEPRINT("row %d:", i++);
                for (cptr = resptr->e_sqconst; cptr; cptr = cptr->sqcnext)
                {
                        prcolvalue((int)cptr->type, cptr->len, cptr->value);
                }
                TRACEPRINT("\n");
                resptr = resptr->e_subqnext;
        }
        return;
}
```

50

```
/*
** SQ_PRINTCORROW
**
**      Print out the correlation values for the current subquery and
**      print out the result value of the subquery execution.
**      This function is only used as a diagnostic when trace flag 555
**      is on and there is a discrepancy between the execution result
**      and the result stored in the subquery cache.
**
** Parameters:
**      esubq       - E_SUBQUERY containing the cache.
**
** Returns:
**      Nothing.
**
*/

SYB_STATIC void
sq_printcorrow(E_SUBQUERY *esubq)
{
        CONSTANT    *constp;    /* Used to save dereferrencing */
        CONSTLIST   *corptr;    /* To scan the list
                                ** of correlation values
                                */

TRACEPRINT("Correlation and result values where error occurred.\n");

/* Print the correlation values */
        for (corptr = esubq->e_sqcorrlist; corptr; corptr = corptr->clnext)
        {
            constp = corptr->clconst;
            prcolvalue((int)constp->type, constp->len, constp->value);
        }

/* Now print the result value */
        constp = (CONSTANT *)(esubq->e_sqresult->left);
        prcolvalue((int)constp->type, constp->len, constp->value);

TRACEPRINT("\n");
}
```

What is claimed is:

1. In a computer system having a processor, a memory, and a storage device, said storage device storing a database comprising rows of data records, each data record storing information in database columns, a method for executing a database query for selecting particular ones of said data records, the method comprising:
   (a) receiving a database query specifying selection of particular ones of said data records, said database query comprising an expression specifying a query condition and further comprising at least one database subquery nested within the database query, said subquery comprising an expression specifying a subquery result which is determined before evaluation of the expression for the database query is undertaken, the expression for the subquery being dependent upon at least one input value from a database column of said database;
   (b) creating a subquery cache in said memory for storing subquery results computed for corresponding input values from said database, wherein
      said subquery cache is divided into a plurality of cache rows, each row for storing a subquery result computed for corresponding input values,
      said cache rows are arranged from top to bottom of said subquery cache, said top of said subquery cache storing a most-recently computed subquery result, and
      said subquery cache has a size; and
   (c) executing said database query by:
      (i) scanning each said data records of said database for evaluating whether the data record being scanned meets the query condition;
      (ii) as each data record is scanned, if said at least one input value is already stored in said subquery cache, evaluating said expression for the subquery by retrieving the corresponding subquery result;
      (iii) storing cache statistics in said memory, said cache statistics including a number of hits, a number of misses, and a number indicating the maximum depth in said subquery cache a hit has occurred; and
      (iv) adjusting said size of said subquery cache based on said cache statistics.

2. The method of claim 1, wherein said database query comprises a Structured Query Language (SQL) command.

3. The method of claim 2, wherein said SQL command specifies selection of particular ones of said data records according to data records satisfying an SQL "WHERE" clause.

4. The method of claim 3, wherein said subquery expression is nested within said SQL "WHERE" clause of said SQL command.

5. The method of claim 1, wherein said subquery cache is reduced in size at step (c)(iv) when the maximum depth into said subquery cache that a hit has occurred is, during query execution, less than the existing size for said subquery cache.

6. The method of claim 1, wherein step (c)(iv) comprises:
   if no cache hits occur after scanning a pre-selected number of cache lookups, discontinuing use of said subquery cache.

7. In a computer system having a processor, a memory, and a storage device, said storage device storing a database comprising rows of data records, each data record storing information in database columns, a method for executing a database query for selecting particular ones of said data records, the method comprising:
   (a) receiving a database query specifying selection of particular ones of said data records, said database query comprising an expression specifying a query condition and further comprising at least one database subquery nested within the database query, said subquery comprising an expression specifying a subquery result which is determined before evaluation of the expression for the database query is undertaken, the expression for the subquery being dependent upon at least one input value from a database column of said database;
   (b) creating a subquery cache in said memory for storing subquery results computed for corresponding input values from said database, wherein said subquery cache is divided into a plurality of cache rows, each row for storing a subquery result computed for corresponding input values, said cache rows being arranged from top to bottom of said subquery cache, said top of said subquery cache storing a most-recently computed subquery result, said subquery cache having a size; and
   (c) executing said database query by:
      (i) scanning each said data records of said database for evaluating whether the data record being scanned meets the query condition;
      (ii) as each data record is scanned, if said at least one input value is already stored in said subquery cache, evaluating said expression for the subquery by retrieving the corresponding subquery result;
      (iii) storing cache statistics in said memory describing how often said expression for the subquery is determined by retrieving the corresponding subquery result from said subquery cache; and
      (iv) adjusting said size of said subquery cache based on said cache statistics such that if all cache hits occur at the top of said subquery cache after scanning a pre-selected number of times, said size of said subquery cache is adjusted to one row.

8. The method of claim 7, wherein said pre-selected number of times is set equal to the number of times required to fill said subquery cache completely at least once.

9. In a computer system having a processor, a memory, and a storage device, said storage device storing a database comprising rows of data records, each data record storing information in database columns, a method for executing a database query for selecting particular ones of said data records, the method comprising:
   (a) receiving a database query specifying selection of particular ones of said data records, said database query comprising an expression specifying a query condition and further comprising at least one database subquery nested within the database query, said subquery comprising an expression specifying a subquery result which is determined before evaluation of the expression for the database query is undertaken, the expression for the subquery being dependent upon at least one input value from a database column of said database;
   (b) creating a subquery cache in said memory for storing subquery results computed for corresponding input values from said database, wherein said subquery cache is divided into a plurality of cache rows, each row for storing a subquery result computed for corresponding input values, said cache rows being arranged from top to bottom of said subquery cache, said top of said subquery cache storing a most-recently computed subquery result, said subquery cache having a size; and
   (c) executing said database query by:
      (i) scanning each said data records of said database for evaluating whether the data record being scanned meets the query condition;
      (ii) as each data record is scanned, if said at least one input value is already stored in said subquery cache, evaluating said expression for the subquery by retrieving the corresponding subquery result;

(iii) storing cache statistics in said memory describing how often said expression for the subquery is determined by retrieving the corresponding subquery result from said subquery cache; and (iv) adjusting said size of said subquery cache based on said cache statistics such that if all cache hits occur within a certain row depth from the top of said subquery cache after scanning a pre-selected number of times, said size of said subquery cache is adjusted based on said row depth.

10. The method of claim 9, wherein said pre-selected number of times is set equal to the number of times required to fill said subquery cache completely at least twice.

11. In a database system comprising a processor, a memory, and a storage device, said storage device storing a database comprising rows of data records, each data record storing information in database columns, an improved query execution unit comprising:

means for receiving a database query having at least one database subquery nested within the database query, said subquery comprising an expression specifying a subquery result which is determined before evaluation of the expression for the database query is completed, the expression for the subquery being dependent upon at least one input value from a database column of said database;

a subquery cache in said memory for caching subquery results computed for corresponding input values from said database wherein said cache rows are arranged from toy to bottom of said subquery cache, said top of said subquery cache storing a most recently computed subquery result;

means for monitoring performance of said subquery cache during query execution, said means for monitoring including
means for storing a least-recently-used depth value,
means for storing a hit counter, and
means for storing a miss counter;

means for executing said database query by scanning each said data records of said database for evaluating whether the data record being scanned meets the query condition; and means, responsive to said monitoring means, for dynamically adjusting the size of said subquery cache based on said performance of said subquery cache for input values scanned from said data records during query execution.

12. The system of claim 11, wherein said means for receiving a database query includes:

a database server coupled to a database client, said database client requiring selection of particular data records from the database based on a query condition.

13. The system of claim 11, wherein said subquery cache has an initial size equal to about 2 kilobytes in said memory.

14. The system of claim 11, wherein said subquery cache has an initial size set to store in said memory about 50 to 150 subquery result/subquery input value pairs.

15. The system of claim 11, wherein said monitoring means comprises:

a hits counter stored in said memory for tracking how many times a hit occurs at said subquery cache when scanning said data records.

16. The system of claim 11, wherein said monitoring means comprises:

a misses counter stored in said memory for tracking how many times a miss occurs at said subquery cache when scanning said data records.

17. The system of claim 11, wherein said means for dynamically adjusting size of said subquery cache comprises:

means for reducing size of said subquery cache to one row when said data records are sorted.

18. The system of claim 11, wherein said means for dynamically adjusting size of said subquery cache comprises:

means for reducing size of said subquery cache to a number of rows equal to how many unique subquery result/subquery input value pairs occur in said data records.

19. In a computer system having a processor, a memory, and a storage device, said storage device storing a database comprising rows of data records, each data record storing information in database columns, a method for executing a database query for selecting particular ones of said data records, the method comprising:

receiving a database query specifying selection of particular ones of said data records, said database query comprising an expression specifying a query condition and further comprising at least one database subquery nested within the database query, said subquery comprising an expression specifying a subquery result which is determined before evaluation of the expression for the database query is undertaken, the expression for the subquery being dependent upon at least one input value from a database column of said database;

creating a subquery cache in said memory for storing subquery results computed for corresponding input values from said database, wherein
said subquery cache is divided into a plurality of cache rows, each row for storing a subquery result computed for corresponding input values,
said cache rows are arranged from top to bottom of said subquery cache,
said top of said subquery cache stores a most-recently computed subquery result;

initially setting said subquery cache to have a size equal to a maximum size;

initializing cache statistics including a hit counter, a miss counter, and a maximum depth value;

executing said database query by scanning said data records of said database for evaluating whether the data record being scanned meets the query condition, and for each data record encountered until said subquery cache is filled once, performing substeps of:

(a) if said at least one input value is already stored in said subquery cache,
evaluating said expression for the subquery by retrieving the corresponding subquery result,
increasing the hit counter, and
updating the maximum depth value if the hit is at a location in said subquery cache that is greater than the current value of the maximum depth counter, and (b) if said at least one input value is not already stored in said subquery cache,
evaluating said expression for the subquery, and
storing the corresponding subquery result in said subquery cache;

if said subquery cache is filled and all hits are in the first row, setting said subquery cache size to one for the duration of the query;

if said subquery cache is filled and there are no hits, setting said subquery cache size to one, continuing execution of the query for a particular number of data records, and if there are still no hits, ceasing use of said subquery cache; and if said subquery cache is filled and there are hits beyond the first row, continuing to execute the query and adjusting the size of said subquery cache based on said cache statistics.

20. In a client/server database system, an improved method for executing a database query submitted by a client to a database server, said database query including a subquery, the method comprising:

storing a cache of a particular size in memory for caching a subquery result computed from input values to the subquery;

executing the query for providing a query result to the client;

storing computed subquery result values in said cache with cache rows arranged from top to bottom of said subquery cache, said top of said subquery cache storing a most-recently computed subquery result;

while executing the query, updating statistics describing use of said subquery cache during query execution, said statistics including a number of hits, a number of misses, and a number indicating the maximum depth in said subquery cache a hit has occurred; and while executing the query, adjusting size of said subquery cache based on said statistics.

21. The method of claim 20, wherein said particular size is initially set to a maximum size for said subquery cache.

22. The method of claim 20, wherein said adjusting step includes:

decreasing size of said subquery cache when hits to said subquery cache are occurring in only a portion of said subquery cache.

23. The method of claim 20, wherein said adjusting step includes:

completely eliminating said subquery cache when no hits to said subquery cache occur.

24. The method of claim 20, wherein said adjusting step includes:

adjusting size of said subquery cache to a single row when hits to said subquery cache occur only at the top.

* * * * *